United States Patent
Nobuta et al.

(10) Patent No.: US 6,775,033 B1
(45) Date of Patent: Aug. 10, 2004

(54) IMAGE COMMUNICATION APPARATUS AND COMMUNICATION CONTROL METHOD THEREOF

(75) Inventors: Hiroshi Nobuta, Yamato (JP); Yasuhide Ueno, Hino (JP); Susumu Matsuzaki, Toride (JP); Takeshi Toyama, Hiratsuka (JP); Muneki Nakao, Kashiwa (JP); Naoki Sugawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,183

(22) Filed: Oct. 26, 1999

(30) Foreign Application Priority Data

Oct. 27, 1998 (JP) .......................................... 10-306156
Oct. 27, 1998 (JP) .......................................... 10-306158

(51) Int. Cl.[7] .............................................. H04N 1/32
(52) U.S. Cl. .................................. 358/468; 358/426.16
(58) Field of Search ............................. 358/468, 400, 358/508, 405, 406, 426.16

(56) References Cited

U.S. PATENT DOCUMENTS 4,682,215 A * 7/1987 Adachi 6,005,673 A 12/1999 Murai et al. ................. 358/434
6,233,324 B1 * 5/2001 Sebestyen

FOREIGN PATENT DOCUMENTS

JP          09-233304        9/1997        ............ H04N/1/32

* cited by examiner

Primary Examiner—Jerome Grant, II
(74) Attorney, Agent, or Firm—Fitzpatrick, Cella, Harper & Scinto

(57) ABSTRACT

An image communication apparatus and a communication controlling method thereon, wherein in the case where image data having an attribute not specified by the ITU-T recommendation is transmitted, regardless of an attribute of image data to be transmitted, a reception command including a first image attribute specified by the ITU-T recommendation are sent out, and information including a second image attribute of image data to be transmitted is sent out in a phase transmitting the image data after the reception command is sent out. And when an image is transmitted with the second image attribute, a transmission takes place with a binary file transfer communication procedure following a first communication procedure specified by the ITU-T recommendation so that image data having an image attribute not standardized by the ITU-T recommendation can be transmitted.

9 Claims, 26 Drawing Sheets

FIG. 18

| 1800 | | | | | | |
|---|---|---|---|---|---|---|
| | protocol-version | | | | | VERSION NUMBER FIXING |
| | file-name | IMPLICIT | | | Filename-Attribute | SEQUENCE GraphicString |
| | permitted-action | IMPLICIT | | | Permitted-Action-Attribute | BIT STRING |
| | contents-type | | | | Contents-type-Attribute | CHOICE OBJECT IDENTIFIER |
| 1800 | storage-account | IMPLICIT | | GraphicString | | READOUT COMMENCEMENT TIME |
| | data-and-time-of-creation | IMPLICIT | | | GeneralizedTime | |
| | data-and-time-of-last-modification | IMPLICIT | | | GeneralizedTime | |
| | data-and-time-of-last-read-access | IMPLICIT | | | GeneralizedTime | |
| 1800 | identity-of-creator | IMPLICIT | | GraphicString | | |
| | identity-of-last-modifier | IMPLICIT | | GraphicString | | |
| | identity-of-last-reader | IMPLICIT | | GraphicString | | FILE SIZE |
| 1800 | filesize | IMPLICIT | | INTEGER | | |
| | future-filesize | IMPLICIT | | INTEGER | | |
| | access-control | | | | Acces-control-Attribute | |
| | legal-qualification | IMPLICIT | | GraphicString | | |
| | private-use | IMPLICIT | | | Private-Use-Attribute | SEQUENCE manufacture-values |
| 1800 | structure | | | OBJECT IDENTIFIER | | |
| | application-reference | | | | General-Identifier | CHOICE OBJECT IDENTIFIER |
| | | | | | | SEQUENCE GraphicString |
| | machine | IMPLICIT | SEQUENCE | GraphicString | | |
| | operating-system | IMPLICIT | | OBJECT IDENTIFIER | | |
| | recipient | IMPLICIT | SEQUENCE | GraphicString | | |
| 1800 | character-set | IMPLICIT | SEQUENCE | GraphicString | | |
| | compression | | | | General-Identifier | CHOICE OBJECT IDENTIFIER |
| | | | | | | SEQUENCE GraphicString |
| | environment | IMPLICIT | SEQUENCE | GraphicString | | |
| | pathname | IMPLICIT | SEQUENCE | GraphicString | | |
| 1800 | user-visible-string | IMPLICIT | SEQUENCE | GraphicString | | |
| | data-file-content | CHOICE | | EXTERNAL | | NOT TO BE USED |
| | | | | ANY | | DECLARATION STRICTLY IN ACCORDANCE WITH X208 |

FIG. 19

| | | OUTLINE ON USAGE METHOD | |
|---|---|---|---|
| protocol-version | | | |
| file-name | FILE NAME (CHARACTER COLUMN) | USER CAN FILL IN AT THE TIME OF TRANSMISSION | THANKYOUxxxyyy.CDP (xxx IS TIME INFORMATION, AND yyy IS ACCUMULATED COUNTER VALUE) |
| contents-type | DESCRIPTION METHOD OF CONTENTS CHOICE (OBJ ID or ANY OP) DETAILS ARE IN Application-reference | unstructured-binary FIXING | iso(0)standard(40)8571(8571) document-type(5)unstructured-binary(3) |
| data-and-time-of-creation | TIME (DESCRIPTION ON SPECIFICATIONS) | READOUT TIME TO BE USED | AT 13:15 ON OCTOBER 30, 1998, ETC. |
| identity-of-creator | CHARACTER COLUMN | | COPYING ABBREVIATION OF USER'S NAME OR THE LIKE ALREADY REGISTERED IN THE MACHINE THEREOF |
| filesize | FILE SIZE | MANUSCRIPT TRANSMISSION LACKS THIS ITEM | |
| application-reference | G. I. | SEQUENCE CHARACTER COLUMN IS SELECTED AND DECLARED | IMAGE-001, FDM=001/FAX-ORG |
| machine | SEQUENCE CHARACTER COLUMN | | BJ-FAX Color 1 |
| character-set | OBJ. ID | | |
| compression | G. I. | SEQUENCE CHARACTER COLUMN IS SELECTED AND DECLARED | DPCM Ver. 1 RGB/W=360/L=540 /DPIH=90/DPIV=90 |

FIG. 20

| FIRST OCTET (INDISPENSABLE) | | SECOND OCTET (OPTIONAL) | AS FROM THIRD OCTET (OPTIONAL) |
|---|---|---|---|
| FIF | Diagnostic code | Frame Number | Diagnostic Information |

201   202   203

Diagnostic Information : = <Length><Diagnostic message>

IMAGE COMMUNICATION APPARATUS AND COMMUNICATION CONTROL METHOD THEREOF

BACKGROUND OF THE INVENTION

This invention relates to an image communication apparatus capable of sending or receiving a color image as well as a monochromatic image and to a communication control method thereof.

Conventionally, ITU-T T.30 recommendation is known as a procedure to transmit a color image. When this T.30 recommendation is applied, the minimum width of the image transmittable was a width of A4 paper (210 mm) and its resolution is limited to 100 dpi, 200 dpi, 300 dpi, and 400 dpi.

On the other hand, the size for a color image to be used mainly at home is generally smaller than a version of A4, such as an L-size printed picture (85 mm×127 mm or the like), an official postcard or the like. Due to this, when image data of a picture in an L-size is transmitted, it is necessary to change the size to an A4 size by adding marginal data, or enlarge the image data to constitute an A4 size for transmission. In addition, a low-priced color printer for domestic use capable of printing a color image has been popular, and the resolution of a print head of the printer is 360 dpi and 720 dpi.

This gives rise to a necessity that in the case where image data transmitted in the above-described resolution is received and printed at home or the like, printing should be implemented subject to decimal multiplication of the image data received, for example, in a resolution of 400 dpi or the like by 0.9 or the like, or subject to resolution conversion with multiplication not involving an integer. However, implementation of such conversion involving such multiplication rates gives rise to a remarkable deterioration of quality of a printed image.

In addition, it is necessary to implement communication by using a non-standard procedure signal such as NSF/NSS/NSC (hereinafter, referred to as NSX) to transmit image data in any special size or resolution not yet standardized. However, in a procedure using these NSX signal, only when manufacturer's code (which is different in manufactures) and model code or the like included in the NSX signal correspond to that of a receiver side, communication can be implemented, and the communication procedure using these NSX signal will be original. Therefore, the communication using the NSX signal could be performed only among limited models of the same manufacturer. Moreover, in a case where a transit transmission is implemented via an exchange such as F network or the like, or in another case even with the transmitting terminal and receiving terminal being models of the same manufacturer, the communication is not performed when an intermediate machine such as an exchanger or the like was a product of a different manufacturer.

SUMMARY OF THE INVENTION

The present invention has been accomplished in view of the above-described conventional examples, and the object thereof is to provide an image communication apparatus which is capable of implementing communication between different models and image communication for various images by executing a standard communication procedure with high flexibility without using any non-standardized procedure when image data not standardized according to the ITU-T recommendation is transmitted, and to provide a communication controlling method thereof.

In addition, the object of the present invention is to provide an image communication apparatus as well as a communication control method thereof which have been made communicable without considering an attribute of an image to be communicated having been ITU-T recommendation or not.

In addition, the object of the present invention is to provide an image communication apparatus which executes an image communication using a standard procedure without being inconsistent with the ITU-T recommendation by transmitting a non-standard attribute in an image data communicating phase to a receiver side when image data having non-standard attribute is transmitted, as well as a communication controlling method thereof.

The object of the present invention is to provide an image communication apparatus which is capable of implementing communication between different manufactures' models by executing a standard communication procedure with high flexibility without using any non-standardized procedure when image data not standardized according to the ITU-T recommendation is transmitted, and to provide a communication controlling method thereof.

Moreover, the object of the present invention is to provide an image communication apparatus which is capable of implementing transmission and reception by changing a communication procedure even when an attribute of image data for transmission and reception is not standardized by the ITU-T recommendation, and to provide a communication controlling method thereof.

In order to attain the above-described objects, the image communication apparatus of the present invention is configured as follows. That is, the image communication apparatus comprises:

communication means to transmit image data in the G3 facsimile procedure, reception command transmitting means for transmitting a reception command including a first image attribute of an image to be transmitted which is specified by the ITU-T recommendation, attribute transmitting means for transmitting information including a second image attribute of the image to be transmitted in a phase to transmit the image after the command is sent out by the reception command transmission means, and controlling means for controlling data transmission so that in a case where an image having attribute not specified by the ITU-T recommendation is transmitted, regardless of the attribute of image to be transmitted, a reception command including the first image attribute specified by the ITU-T recommendation is sent by the reception command transmission means and information including the second image attribute is sent by the attribute transmitting means.

In order to attain the above-described objects, the image communication apparatus of the present invention comprises:

communication means for receiving image data in the G3 facsimile procedure specified by the ITU-T recommendation, reception command receiving means for receiving a reception command including a first image attribute specified by the ITU-T recommendation of an image to be transmitted from a sender side by the communication means, determination means for determining whether or not an image having a second image attribute not specified by the ITU-T recommendation can be processed upon receipt of information including the second image attribute in a phase to receive the image succeeding reception of the command, and processing means for processing a received image by means of the second image attribute, not by means of the first image attribute included in the reception command, based on the determination outcome from the determination means.

In order to attain the above-described objects, the image communication method of the present invention comprises the following steps.

a reception command transmitting step of transmitting a reception command including a first image attribute of an image to be transmitted which is specified by the ITU-T recommendation, an attribute transmitting step of transmitting the information including a second image attribute of an image to be transmitted in a phase to transmit the image after sending out the reception command in the reception command transmission step, and a controlling step of controlling so that in a case where an image having an attribute not specified by the ITU-T recommendation is transmitted, regardless of an attribute of an image to be transmitted, the reception command including the first image attribute specified by the ITU-T recommendation is sent out in the reception command transmission step and the information including the second image attribute is sent in the attribute transmitting step.

In order to attain the above-described objects, the image communication method of the present invention comprises the following steps.

a reception command receiving step of receiving a reception command including a first image attribute specified by the ITU-T recommendation of an image to be transmitted from a sender side, a determination step of determining whether or not a second image attribute can be processed upon receipt of information including the second image attribute not specified by the ITU-T recommendation in a phase to receive the image succeeding the reception command, and a processing step of processing a received image by means of the second image attribute but not the first image attribute included in the reception command, based on the determination in the determination step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 18 is a diagram for explaining a BFT format based on the ITU-T recommendation (T.434);

FIG. 19 is a diagram for explaining the contents of BFT header in the present embodiment;

FIG. 20 is a diagram for explaining a format of FDM signal based on ITU-T recommendation;

DETAILED DESCRIPTION OF THE PREFERRED EMBODIMENTS

With reference to the attached drawings, the suitable embodiment of the present invention will be explained in detail as follows:

[Outlines]

An apparatus in the present embodiment is a facsimile apparatus equipped with a function of a cordless telephone (extension) in a small power and analogue formation, and having function fulfilling the ITU recommendation G3 specification, and in addition, comprising a color image reading unit as well as a color images recording unit, and having a color copying function as well as a color image communication function, and recognizing an voice by a voice recognizing unit to enable an automatic dialing to a receiver side.

A color image reading unit comprise a hand-scanner unit being able to attach/detach to/from a main body of the facsimile apparatus, which configuration enables to read not only a sheet-shaped manuscript but also a book-type manuscript, etc. A reading sensor of the scanner unit is, for example, a tight-fitted type color read sensor which outputs image data on each color of RGB in order of line, and for example the maximum reading width is B4 width and the reading resolution is 200 dpi.

A color image recording unit is, for example, an ink-jet type, and either a color ink cartridge having integrated ink tanks for respective colors of CMYK and an ink-jet head unit or a monochromatic ink cartridge having integrated an ink tank of black ink only and an inkjet head unit, is mounted thereon to print an image on a recording paper at a recording resolution of, for example, 360 dpi. As concerns a recording width of the image, for example, whichever cartridge may mounted, the maximum recording width at the time of onochromatic recording is B4, but only when a color cartridge is mounted, the maximum recording width at the time of color recording is A4.

In addition, as concerns communication, for example, the maximum communication speed of 9600 bps is given at G3 mode, and ECM mode provided with an error re-sending function in an image transmission is provided.

Figure 1:
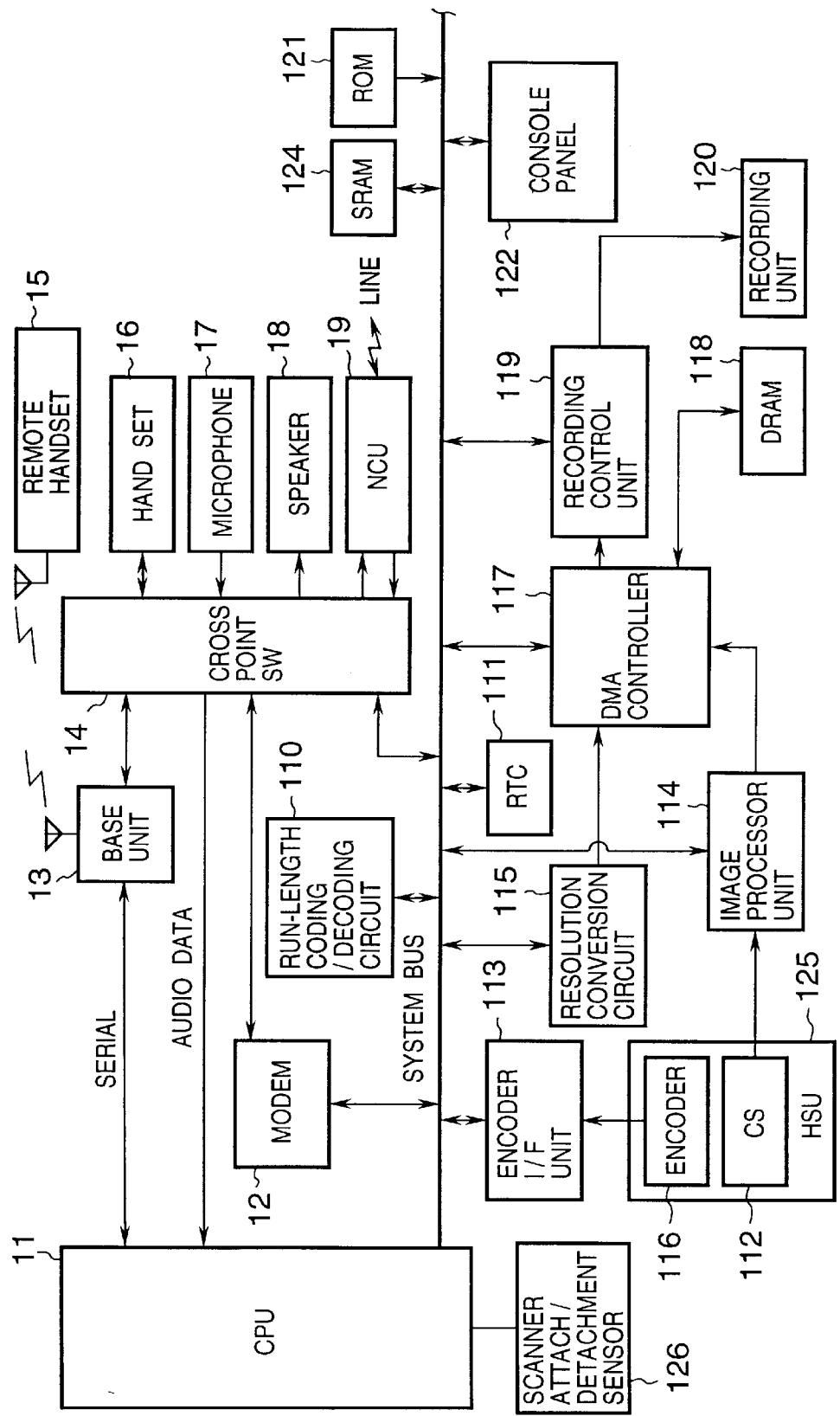
FIG. 1 is a block diagram showing an example of system configuration of a facsimile apparatus of the present embodiment.
Figure 2:
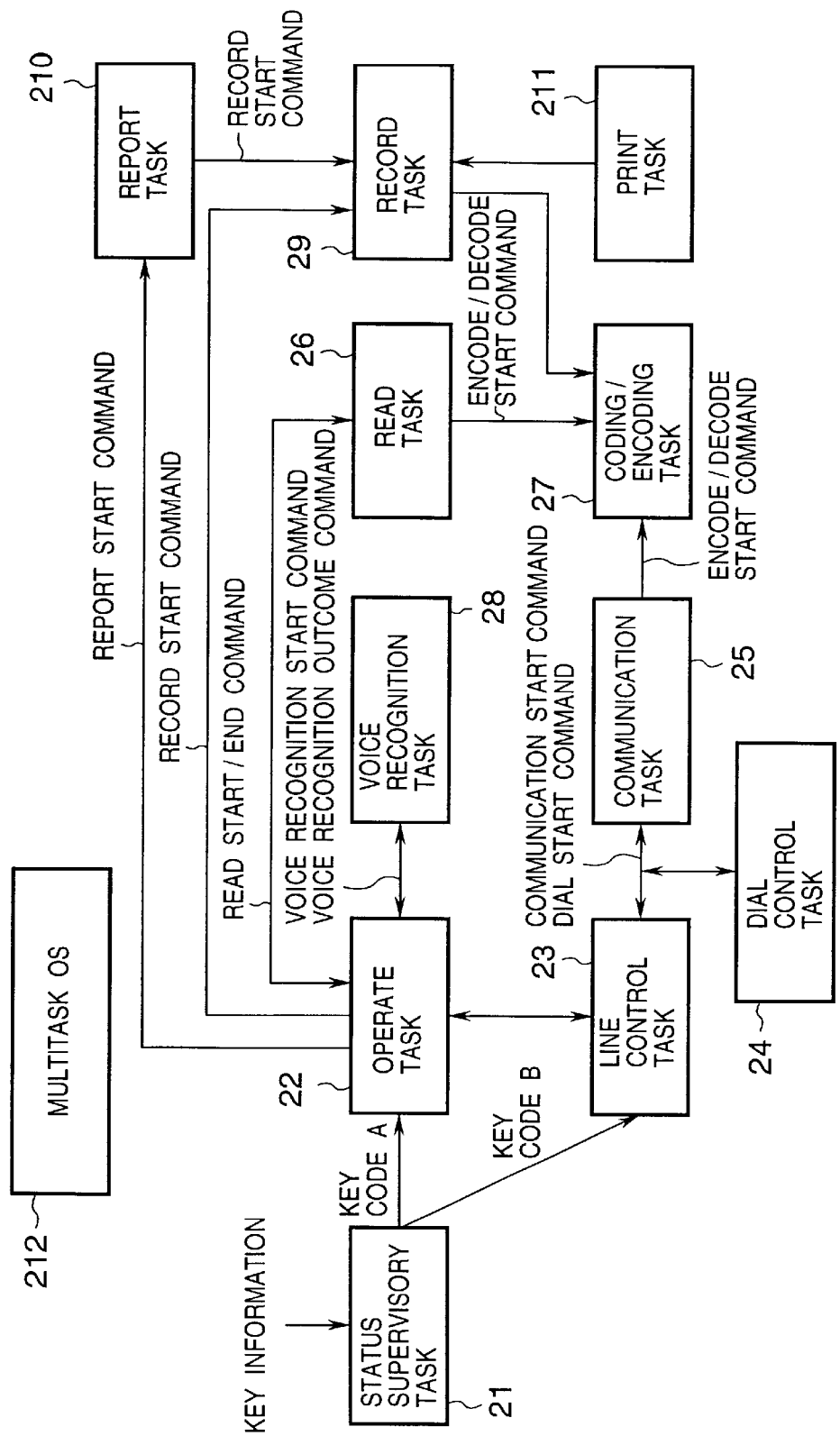
FIG. 2 is a task configuration diagram showing an example of a software of controlling the facsimile apparatus of the present embodiment.
Figure 3:
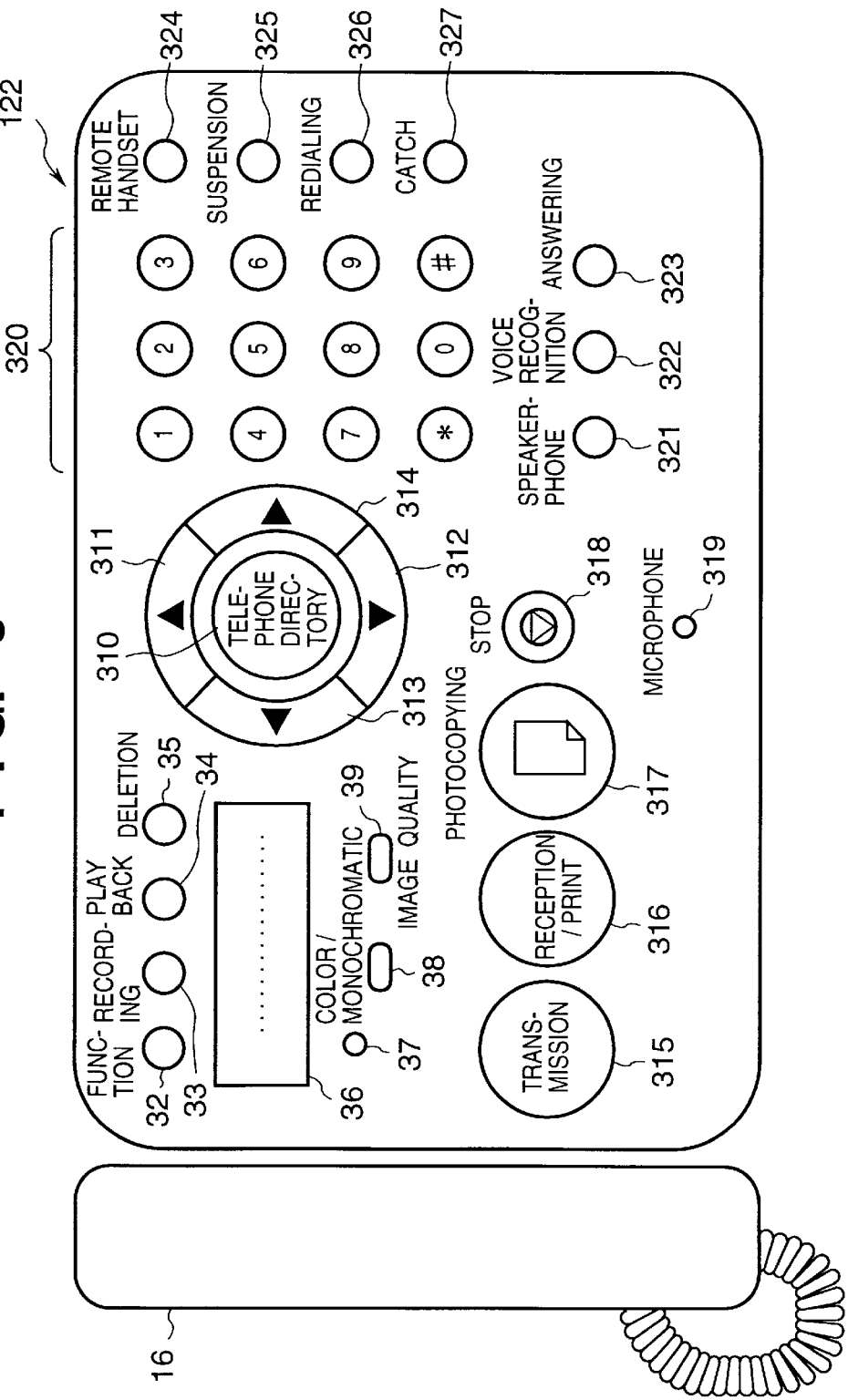
FIG. 3 is a diagram explaining a configuration of a console panel of the facsimile apparatus of the present embodiment.
Figure 4:
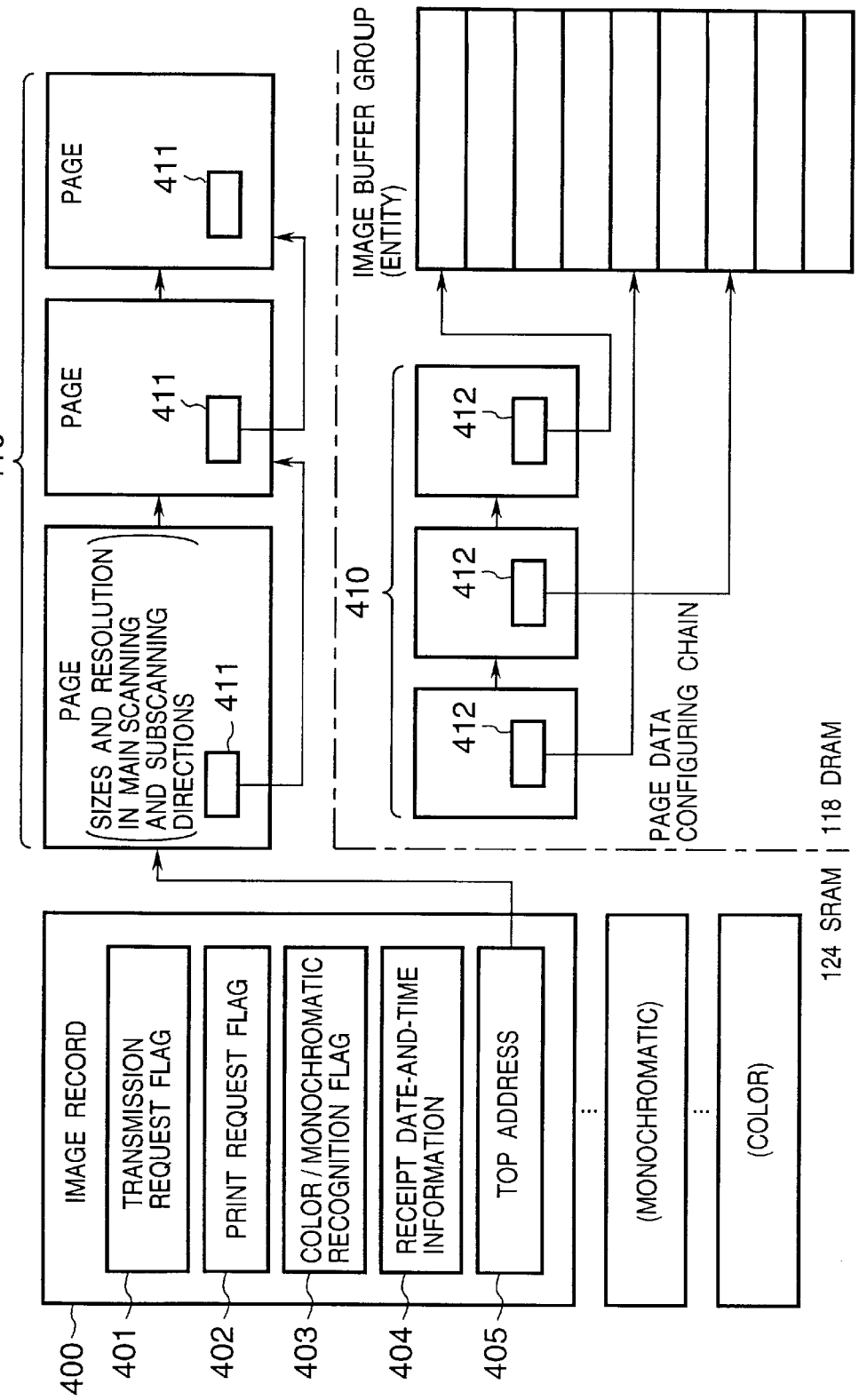
FIG. 4 is a diagram showing an example of an image record being an administration table which is formed by a control unit of the facsimile apparatus of the present embodiment to administrate image data.

FIG. 1 is a block diagram showing an example of configuration of a facsimile apparatus of a present embodiment, FIG. 2 is a task configuration diagram showing an example of a software for an object of controlling the apparatus, and FIG. 3 is a diagram explaining a configuration of a console panel of the apparatus. In addition, FIG. 4 is a diagram showing an example of an image record of an administration table which is formed in an SRAM 124 shown in FIG. 1 by a control unit of the apparatus, in order to administrate image data.

[Configuration]

In FIG. 1, numeral 11 denotes a CPU for functioning as a control unit of the facsimile apparatus, numeral 121 denotes a ROM storing programs and various data, numeral 118 denotes a DRAM which is used as a work memory to be used for implementation of various programs or as a storage memory for audio data for an answering machine as well as for monochromatic and color image data, and for example, memory capacity of the DRAM 118 is 2 MB, breaking down to approximately 0.5 MB to be used for work memory, and to the remaining approximate 1.5 MB to be used for storage of image data and audio data. Numeral 124 denotes an SRAM storing registration data necessary for the apparatus (various soft switches, telephone directory data, audio registration data for audio recognition, and ID data for the apparatus such as telephone number of the apparatus as well as abbreviation, etc.) are registered thereto, and is backed up with a battery so that the data stored in the SRAM 124 is not lost due to a power off.

Numeral 12 denotes a MODEM (modem) for facsimile, the MODEM 12 has a function necessary for ITU recommendation G3 mode and comprises a DTMF recognition function and an audio CODEC function for audio recording as well as audio replay using DRAM, etc. in addition to V.29, V.21, and V27ter. Numeral 13 denotes a base unit for implementing an analogue small power type wireless communication with a wireless handset (remote handset) 15, and the base unit 13 is a known unit controlling wireless communication according to an instruction from the CPU 11.

Reference numeral 14 denotes a connection switch for analogue signals (cross point SW), which is a known circuit to freely change a connection among a telephone receiver hand set 16, a microphone 17 for audio inputting, a speaker 18 for audio reproducing, an NCU 19 for implementing interface with a line, an audio input terminal of the CPU 11, and MODEM 12 and the base unit 13, in accordance with a designation from the CPU 11.

Reference numeral 110 denotes a known run length coding/decoding circuit which generates a run-length code from monochromatic 2-digit image data and inputs a run-length code and decodes it to output monochromatic 2-digit image data, and reference numeral 111 denotes an RTC being a known clock IC. Reference numeral 125 denotes a hand-scanner unit (HSU), and the hand-scanner unit 125 has a rotary encoder (RC) 116 to measure a distance which a color contact sensor (CS) 112 and the HSU 125 have moved on a manuscript, and is connected with a main body of the apparatus via a curl cord in a freely separable fashion. Reference numeral 113 denotes an encoder interface (I/F) unit to generate mobile distance data from information on the number of rotation of the rotary encoder 116, one of out signals of the USU 125, and notify the CPU 11 the mobile distance data.

Reference numeral 114 denotes an image processor unit, which, in a case where color image data is stored into the DRAM 118 based on an instruction from the CPU 11, inputs analogue RGB signals (being linear sequential and with resolution of 200 dpi) outputted from the color contact sensor 112, and converts them into 90 dpi digital image data of 8 bites for RGB (24 bites per pixel), respectively. In addition, in the case where a color copying is implemented in accordance with an instruction from the CPU 11, the analogue RGB signals outputted from the color contact sensor 112 are converted to YMCK 2-digit digital image data of 360 dpi. The converted digital image data are supplied to a DMA controller 117, and the DMA controller 117 sends the image data to the DRAM 118 in a case where the RGB color image data of 90 dpi is to be stored in the DRAM 118, and transmits YMCK 2-digit data of 360 dpi to a recording control unit 119 in a case where a color copying is to be implemented.

In addition, in a case where monochromatic data is to be stored in the DRAM 118, the image processor unit 114 converts the analogue RGB signals outputted from the color contact sensor 112 to monochromatic 2-digit digital image data of 200 dpi to supply to the DMA controller 117. In a case where a monochromatic copying is to be implemented, the image processor unit 114 converts the analogue RGB signals outputted from the color contact sensor 112 to monochromatic 2-digit digital image data of 360 dpi to supply to the DMA controller 117. The DMA controller 117 sends the monochromatic image data to the DRAM 118 in a case where the monochromatic image data is to be stored in the DRAM 118, and transmits the monochromatic image data to the recording control unit 119 in a case where the monochromatic copying is to be implemented.

The recording control unit 119 converts the inputted image data to a data format which a recording unit 120 is capable of recording. The recording unit 120 is a known color printer portion of ink-jet type, and moves a-cartridge comprising an ink tank and an ink injection portion integrally, in a main scanning direction, and moves a recording paper to a sub-scanning direction to record an image on the paper. The CPU 11 can determine which of color cartridge or monochromatic cartridge is equipped with the recording unit 120 based on a configuration of electric contact between the recording unit 120 and the cartridge serves.

Reference numeral 115 denotes a known resolution conversion circuit to input monochromatic 2-digit image data and to perform a resolution conversion, and is used to enlarge or reduce the size of a monochromatic image and is also used-for an object of matching the resolution of monochromatic image having been received from the line with the recording resolution of the recording unit 120.

Reference numeral 122 denotes a console panel being functioning as an operating unit of the apparatus, and as shown in FIG. 3, comprises various keys, display lamps, and an LCD display 36. In addition, a microphone 17 and a speaker 18, etc. are disposed on the console panel 122.

Reference numeral 126 denotes a sensor to detect attach/detachment status of the hand-scanner unit 125 to/from the main body of the apparatus, and as per output from the sensor 126, the CPU 11 determines whether a sheet mode is set to read a sheet-type manuscript or hand-scan mode is set to read a solid object, such as a book-type manuscript, etc.

Next, the configuration of the console panel 122 shown in FIG. 3 will be explained.

In FIG. 3, reference numeral 16 denotes a hand set, reference numeral 32 denotes a "function key" for various registrations and settings, reference numeral 33 denotes a "sound recording key" to be used when message or conversation on line is recorded on the DRAM 118 as audio data, reference numeral 34 denotes a "play back key" to be used when the audio data recorded in the DRAM 118 is played back by using an audio CODEC of MODEM 12 based on an instruction from the CPU 11, reference numeral 35 denotes a "erasing key" to be used when various data stored in the DRAM 18 is to be erased, and reference numeral 36 denotes an LCD display unit accompanied by back lights capable of displaying two lines, each line including 16 characters, and the display unit 36 is used to display a status of the apparatus and various messages. Reference numeral 37 denotes a "color LED" and is switched on when a color mode is selected by using a "color/monochromatic key" 38. Reference numeral 39 denotes an "image quality key" to select an image quality under a monochromatic mode.

Reference numeral 310 denotes a key serving both as a "telephone directory key" to retrieve a telephone directory and as a "set key" to settle the contents of registration, etc., and hereinafter will be named as "set key" so as to simplify explanation. Reference numeral 311 denotes an "upward cursor key", reference numeral 312 denotes a "downward cursor key", reference numeral 313 denotes a "leftward cursor key", and reference numeral 314 denotes a "rightward cursor key", and any of them are used by an operation for a display control.

Reference numeral 315 denotes a "transmission key" for a facsimile transmission, and reference numeral 316 denotes a "reception/print key" to perform facsimile reception and printing,of received image data. Reference numeral 31:7 denotes a "copy key" to designate to execute a copy operation, and reference numeral 318 denotes a "stop key" to halt an operation under execution. Reference numeral 319 denotes an opening portion for the microphone 17, reference numeral 320 denotes a telephone key pad portion, reference numeral 321 denotes a "speaker phone key" to activate the microphone 17 with an acquired line and to output audio signal captured by the microphone 17 to the acquired line, and to regenerate voice on the line by the speaker 18, reference numeral 322 denotes a "voice recognition key" to designate to execute an automatic dialing by a voice recognition, reference numeral 323 denotes an "answering key" to automatically record the contents of talking into the DRAM 118 while a phone call is received, reference numeral 324 denotes an "extension receiver key" to implement talking by using the remote handset 15, reference numeral 325 denotes a "hold key" to leave the on-line status held and to transmit a melody to a caller, reference numeral 326 denotes a "redial key" to dial automatically the telephone number of recipient of the phone call last time, and reference numeral 327 denotes a "catch key" to be used to perform so-called catch-phone call which enables a user to respond to another phone call while the user is talking over the telephone to somebody, and then enables the user to go back to the former telephone line after the catch-phone call.

[Operation]

Copying (sheet scan) under status that the scanner 125 is mounted on the main body is performed as a direct mode. In the direct mode, a sheet-type manuscript is read and the read image data is outputted to the recording unit 120 for a recording, without storing the image data in the DRAM 118. In this case, since it is unnecessary to store the image data into the DRAM 118, the DRAM 118 will not suffer from memory overflow even at high resolution. Resolution for reading by this scanner 125 is matched with the recording resolution of the recording unit 120. This results in resolution on the image data being 360 dpi in the sub-scanning direction. In addition, the size feasible for the copying is up to B4 width in the case of a monochromatic copying, and up to A4 width in accordance with a specification of the recording unit 120 in the case of a color copying.

Next, in the case where the scanner 125 is detached from the main body of the apparatus and used as a hand-scanner for the copying, a memory mode is set, and the image data read by the scanner 125 is always stored in the DRAM 118 on a page-by-page unit. This is an arrangement to comply with the recording speed in the recording unit 120 being slower than a speed with which a person moves the scanner 125 by hand scanning, and the read image data is temporarily stored in the DRAM 118 so that the hand scanning can be executed and completed rapidly. In addition, when the reading resolution of the scanner 125 is matched with the recording resolution of the recording unit 120 in 360 dpi, the amount of the image data of one page is large enough to occupy the memory area of the DRAM 118 and likely to interrupt the performance of the apparatus. Under the circumstance, an expansion of memory capacity of the DRAM 118 can be considered, but due to such reasons that the expansion of memory capacity will cost much, etc. the reading resolution is suppressed to 200 dpi in the monochromatic mode and 90 dpi in the color mode, which, however, is not intended to set any limitation of the present invention. In addition, due to the similar reasons, although copying size in the monochromatic mode is up to B4 width, copying size in the color mode is limited to not larger than A6 (or the size of an official postcard).

For example, the amount of image data of the B4 size in the monochromatic mode (200 dpi) is approximately 700 KB (Kbyte), and the amount of image data the A6 size in the color mode (90 dpi) is approximately 600 KB, in any of which modes the image data can be stored in the DRAM 118 having a capacity of 1.5 M byte. If the read image data is compressed to be stored in the DRAM 118 so that the reading resolution and the size of a sheet to be read can be improved and enhanced, but as described later, since the compression is taken place by a software in the present embodiment, it takes time so much and reduces an execution speed of hand scanning, which is disadvantageous. In addition, additional hardware for rapid compression/coding will give rise to a big cost increase.

In addition, under the status with the scanner 125 being mounted on the main body, a transmission of image data by reading a manuscript is performed in the direct mode. In the direct mode, the read image data is sent to the modem 12 via the DRAM 118 without storing the image data of one-page in the DRAM 118, and is transmitted to a facsimile of a receiver side while a sheet-type manuscript is being read.

Moreover, in the case where the scanner 125 is detached from the main body and used as a hand-scanner to read a manuscript for a transmission, the memory mode is set, and the data read by the scanner 125 is always stored in the DRAM 118 on a page-by-page unit. This is an arrangement to comply with the communication speed in the modem 12 being slower than the speed with which a person moves the scanner 125 by hand scanning. The read image data is temporarily stored in the DRAM 118 on a page-by-page unit so that the hand scanning can be executed rapidly. In addition, as concerns reading resolution as well as the size of manuscript in this case, the similar operation is performed due to the same reasons as those on the memory mode for copying.

It is determined whether the scanner is used as a hand-scanner or used under the status with the scanner 125 is mounted on the main body, based on a detection signal from the scanner attach/detachment sensor 126.

[Software Configuration]

Next, with reference to the task configuration diagram of the apparatus shown in FIG. 2, a software configuration of the present embodiment will be explained. To the software of the apparatus, an environment under which respective tasks can concurrently run, is provided by a multitask OS 212.

Reference numeral 21 denotes a status supervisory task, supervising each event to be performed in the apparatus, and, when an occurrence of an event requiring change in the status of the apparatus is detected, has a function to notify a corresponding task of information. For example, when key information inputted by the console panel 122 is detected, the key information is transferred to the operate task 22 and/or the line control task 23 and the corresponding functional operation is activated.

The operate task 22 receives key code A information from the status supervisory task 21 to determine an operation mode, issues a start command to a corresponding task which performs a function corresponding to the operation mode and controls a display function of the console panel 122 based on the key code A information.

The line control task 23 controls the NCU 19 to execute the sequence comprising reception of a phone call from the line, acquisition of the line to transmit a dialing signal in accordance with the dial requiring command from the operate task 22, and termination of communication by implementing a line disconnecting, etc. In addition, it is detected by key code B information from the status supervisory task 21 under the line connected status that the "transmission key" 315 and "reception/print key" 316 etc. have been pushed on, and it is automatically determined whether a sender side is a telephone or a facsimile by analyzing a signal on the line, and in the case of facsimile, a communication start command for a facsimile communication is issued to a communication task 25.

Reference numeral 24 denotes a dial control task, and has a function to transmit various dial signals to a switchboard in accordance with a dial start command from the line control task 23 or the communication task 25.

The communication task 25 executes a transmission procedure as well as transmission of image data during a facsimile communication in accordance with the communication start command from the line control task 23.

Reference numeral 26 denotes a read task, and controls the hand-scanner unit (HSU) 125 and the image processor unit 114 in accordance with a read start command from the operate task 22 to execute reading (scanning) of a manuscript image.

Reference numeral 27 denotes a coding/decoding task, and executes coding and decoding procedures of image data in accordance with an encode/decode start command from the communication task 25, the read task 26 and the record task 29. Therefore, in the present embodiment, since the coding and decoding procedures are performed by a software, it takes more processing time compared with an execution of coding and decoding processes by a hardware, but it is possible to reduce hardware costs so much. The known MH coding is applied to monochromatic images, and the known coding method where Huffmann coding is assigned to RGB multi-value DPCM method (a method to calculate difference value between neighboring pixels with respective 8 bit of RGB) is applied to color image data.

Reference numeral 28 denotes a voice recognition task, and is a known voice recognition software to analyze a user's voice inputted from the handset 16, and make comparison with the audio data (a plurality of which could be) registered in advance, and notify information on corresponding to voice data.

The recording task 29 has a function to make the recording unit 120 print out the requested image data in accordance with a record start command from a report task 210 and a print task 211, etc.

The report task 210 is a software for creation of various reports, creating function setting lists such as communication management report recording communication history/ and registered information in the SRAM 124, etc. in character data, developing them into image data and requesting the record task 29 to record.

The print task 211 has a supervising function to always check whether image data which is to be automatically recorded is stored in the DRAM 118, and issues the record start command to the record task 29 when the image data which is to be automatically recorded is detected.

[Image Record]

Next, a configuration of image records shown in FIG. 4 will be explained.

An image record which is an administration table to manage the image data stored in the DRAM 118, is formatted in the SRAM 124 by the multi-task OS 212 at the time of initial operation of the apparatus, making all the image records into an empty status at the point of time. Each task acquires an image record being empty status from the OS 212 as per necessity, and creates an image record which have been filled out with required contents during data exchange between tasks. In addition, each task operates as per necessity with reference to the contents of the created image records.

In FIG. 4, an image record 400 includes a color/monochromatic recognition flag 403 for a document (which could consist of one page or otherwise a plurality of pages) on the DRAM 118, receipt date and time information 404 in the case of an image reception, a print request flag 402 indicating whether activating the automatic print by the print task 211 is in need or not, a transmission request flag 401 indicating whether a transmission operation by the transmission task 25 is in need or not, a top address 405 of a page chain table 410 indicating the information on each page included in the document, etc.

The page chain table 410 indicating information on each page respectively includes a top address 411 of the page chain table indicating the information on the next page, the information on size showing a main scanning width as well as sub-scanning length of a page, the information on resolution showing the resolution of the main scanning as well as sub-scanning of the page likewise, and moreover a top address 412 of the image block chain table in which the top address of the DRAM 118 where the image data of the page is stored. Incidentally, an area recording the image data of the DRAM 118 is subject to blocking according to respective predetermined sizes, and the top address 412 of the image block chain table means the top address of each block.

The communication task 25 completes the contents of the image record at the time of an image reception, and the read task 26 completes the contents of the image record at both an image transmission and a copy operation. The image data no longer in need, since recording or transmission has been over, is erased from the DRAM 118, and then the image record is cleared and the management of that image record is returned to the multi task OS 212 from a task.

[Color Copy Operation]

Next, an operation at the time of a color copy using the hand scanner 125 will be explained briefly.

When the hand scanner unit 125 is detached from the main body of the apparatus, the operate task 22 detects an output of the scanner attach/detachment sensor 126 and automatically recognizes that the hand scanner mode is set. This causes the LCD display unit 36, etc. of the console panel 122, to display that the hand scanning can be executed, and requests a user to select either a copying or a transmission.

Now, suppose that the "copy key" 317 is depressed, and the color mode has been designated by "color/monochromatic key" 38 and the "color LED" 37 is lighted on, then the operate task 22 requests an execution of color image reading for a color copy by hand scan to the read task 26 by the read start command. This causes the read task 26 to receive from the operate task 22 information needed for the color copy operation, and control the hardware, and to input color image data read in accordance with the scanning of the hand-scan unit 125 and store the image data of one page in the DRAM 118. The operate task 22 issues the recording start command to the record task 29 on completion notice from the read task 26, and causes the record task 29 to record the image data stored in the DRAM 118. The record start command attaches image record information filled in with the read task 26, and the record task 29 refers to the information, and reads out the color image data stored in the DRAM 118 by using the DMAC 117, and converts it to the data of resolution of 360 dpi to transmit to the recording control unit 119, and executes a color recording by the recording unit 120. In due course, an image recording in the recording unit 120 of a page is over, then the completion of processing is notified to the operate task 22, and a series of copying operation is over, and the display of the display unit 36 of the console panel 122 is changed to a display indicating the ready state.

[Monochromatic Image Transmission]

Next, an operation in the case where a monochromatic image is transmitted will be explained briefly.

When the hand scanner unit 125 is detached from the main body of the apparatus, the operate task 22 detects an output of the scanner attach/detachment sensor 126 and automatically recognizes that the hand scanner mode is set.

Next, suppose that the "transmission key" 315 on the console panel 122 is depressed, and the black-and-white mode has been set by "color/monochromatic key" 38 and the color LED 37 is lighted off, then the operate task 22 requests an execution of reading of a monochromatic image for a monochromatic transmission by hand scan to the read task 26 by the read start command. This causes the read task 26 to receive from the operate task 22 information needed for the monochromatic transmission, and control the hardware, and to input image data read in synchronization with the scanning of the hand-scan unit 125 and store the image data of one page in the DRAM 118. Next, upon the read task 29 notifying of completion of the reading, the operate task 22 shifts to a destination input operation mode, and causes a user to input a telephone number of the destination. The operate task 22 issues a dial request command to the line control task 23 based on the input telephone number of the destination and starts to connect the line. Upon receipt of the request by the dial request command, the line control task 23 issues a dial-start command to the dial control task 24. When a phone call by the dial control task 24 is completed and the line is connected, the line control task 23 issues a communication start command to the communication task 25 to execute a transmission of the image data stored in the DRAM 118. The communication start command attaches an image record filled by the read task 26, and the communication task 25 refers to the image record and reads out the monochromatic image data stored in the DRAM 118, and encodes the image data while keeping resolution of 200 dpi to transmit to the modem 12, and executes the monochromatic image transmission. In due course, the transmission is over, then the completion of processing is notified to the operate task 22, and a series of transmitting operation is over, and the display of the display unit 36 of the operating unit 122 is changed to the display indicating the ready state.

[Color Image Transmission]

Next, an operation in the case where a color image is transmitted will be explained briefly.

When the hand scanner unit 125 is detached from the main body of the apparatus, the operate task 22 detects an output of the scanner attach/detachment sensor 126 and automatically recognizes that the hand scanner mode is set.

Next, suppose that the "transmission key" 315 on the console panel 122 is depressed and the color mode has been set by "color/monochromatic key" 38 and the "color LED" 37 is lighted on, then the operate task 22 requests an execution of reading a color image for the color transmission by hand scan, to the read task 26 by the read start command. This causes the read task 26 to receive information needed for the color image transmission from the operate task 22, and control the hardware, and to input color image data read in synchronization with the scanning of the hand-scan unit 125 and store the color image data of one page in the DRAM 118. Next, upon the read task 26 notifying of completion of reading, the operate task 22 shifts to a destination input operation mode, and causes a user to input a telephone number of the destination. Next, the operate task 22 issues a dial request command to the line controlling task 23 and starts to connect the line. Upon receipt of the request by the dial requesting command from the operate task 22, the line control task 23 issues a dial start command to the dial control task 24. When phone call instructed by the user is completed by the dial control task 24 and the line is connected, the line control task 23 issues a communication start command to the communication task 25 to cause transmission of the color image data. To this communication start command the image record filled by the read task 26 is attached, and the communication task 25 refers to the image record, and reads out the color image data stored in the DRAM 118, and encodes the color image data while keeping resolution of 90 dpi to transmit to the modem 12, and performs the color image transmission. In due course, the color image transmission is over, then the completion of the processing is notified to the operate task 22, and a series of transmitting operation is over, and the display of the display unit 36 of the operating unit 122 is shifted to the display indicating the ready state.

[Transmission and Reception of Monochromatic Images]

Next, an operation of the apparatus in the case where image data of a monochromatic manuscript and color manuscript is transmitted or received will be explained.

(a) Facsimile Transmission from Talking Over a Telephone

When the "transmission key" 315 of the console panel 122 is depressed during talking over the telephone, the display unit 36 displays a message, "please set a manuscript," to urge a user to set a manuscript to be transmitted back-side up at an entrance for manuscripts. Upon a manuscript being set correctly, reading of the manuscript is started, and after a negotiation for facsimile transmission is executed, the transmission is started. At this time, the display unit 36 displays the message of "during facsimile transmission."

(b) Color Transmission

Before depressing the "transmission key" 315, the "color/monochromatic key" 38 is pushed down to set the color mode and put the "color LED" 37 on. The image size for the color transmission in the embodiment is only the postcard size and no setting such as multiplying ratios, etc. is feasible. At this time, the display unit 38 displays the message of "during color transmission."

(c) Image Transmission Using the Hand-scanner 125

When a cover of the apparatus is opened or the hand-scanner 125 is detached from the main body as at the state of stand-by of the apparatus, the display unit 36 of the console panel 122 displays "hand-scanner→fax transmission/copy". Here, when the "transmission key" 315 is depressed, the facsimile transmission mode is set, and the display 36 displays "transmission width [A4]>[black-and-white] [normal]."

Here, when "color/monochromatic key" 38 is depressed and the color mode is set, the "color LED" 37 is lighted on to disable change in width of a manuscript to be transmitted. This causes the display unit 26 to display "transmission width [postcard] [color] [photograph]". Depression the "set key" 310 under this state causes the display unit 36 to display "reading by hand-scanner, start/end by a set key".

Moreover, when the "color/monochromatic key" 38 is depressed while displaying the message, switching takes place from the color mode to the monochromatic mode to recall the screen display of one step before.

When the "set key" 310 is depressed under the state, without any change in this color/monochromatic mode, while displaying "reading by hand-scanner, start/end by a set key", commencement of reading of manuscript image by using the hand-scanner 125 is instructed, and the message "scanner speed >>>> end by a set key" is displayed. As the travel speed of the scanner 125 is faster, the number of symbol ">" is increased to be displayed.

Here, when the traveling speed of the scanner 125 to be detected by the encoder I/F unit 113 is too fast, "scanner traveling too fast, and end by set key" is displayed.

When the reading of a manuscript by the hand-scanner 125 is completed normally, the display unit 36 displays "confirmation print→do or not", asking to select whether or not a print operation is implemented to confirm the image read by the scanner 125. If "do" is selected, the read image data stored in the DRAM 118 is output to the recording unit 120 and is printed. During the print, "confirmation print being printed" is displayed. And when the printing is over, "input a facsimile number" is displayed, and the telephone number inputted using the telephone key pad 320, etc. is displayed on the display unit 36.

In addition, when "not" is selected, the printing operation by the recording unit 120 is not implemented, and a user is instructed to input a telephone number. Thus, the destination telephone number is inputted, and the "transmission key" 315 is depressed to instruct a transmission of color image, and then the display unit 36 displays "during color transmission". On the other hand, in the case of transmission of a monochromatic image, "during facsimile transmission" is displayed.

(d) Operation Till a Facsimile Reception is Started

The facsimile reception is started by depressing the reception/print key 316. Namely, while talking over the telephone, a user comes to know a reception after he/see hears a tone from a sender side (transmitter), and the user depresses the reception/print key 316 to start the facsimile reception. The facsimile reception is started by depressing the reception key 316 without setting a manuscript under the state that the line is acquired. When the reception key 316 is depressed, the hand set 16 remains off hook and a vocal guidance switch is set "ON," a message of "facsimile is coming. Please hung up the receiver" is given to the user.

At this time, the display unit 36 displays "facsimile is to be received. Hung up the receiver".

While receiving a facsimile signal, the messages, "facsimile being received" and "facsimile being received P1," are displayed alternately in the case of a monochromatic image, and "color being received" and "color being received P1" are displayed on the display unit 36 alternately at the time of reception of a color image.

And when the reception of facsimile is completed normally, an end alarm is activated and a message of "reception completed" is displayed on the display unit 36.

Figure 5:
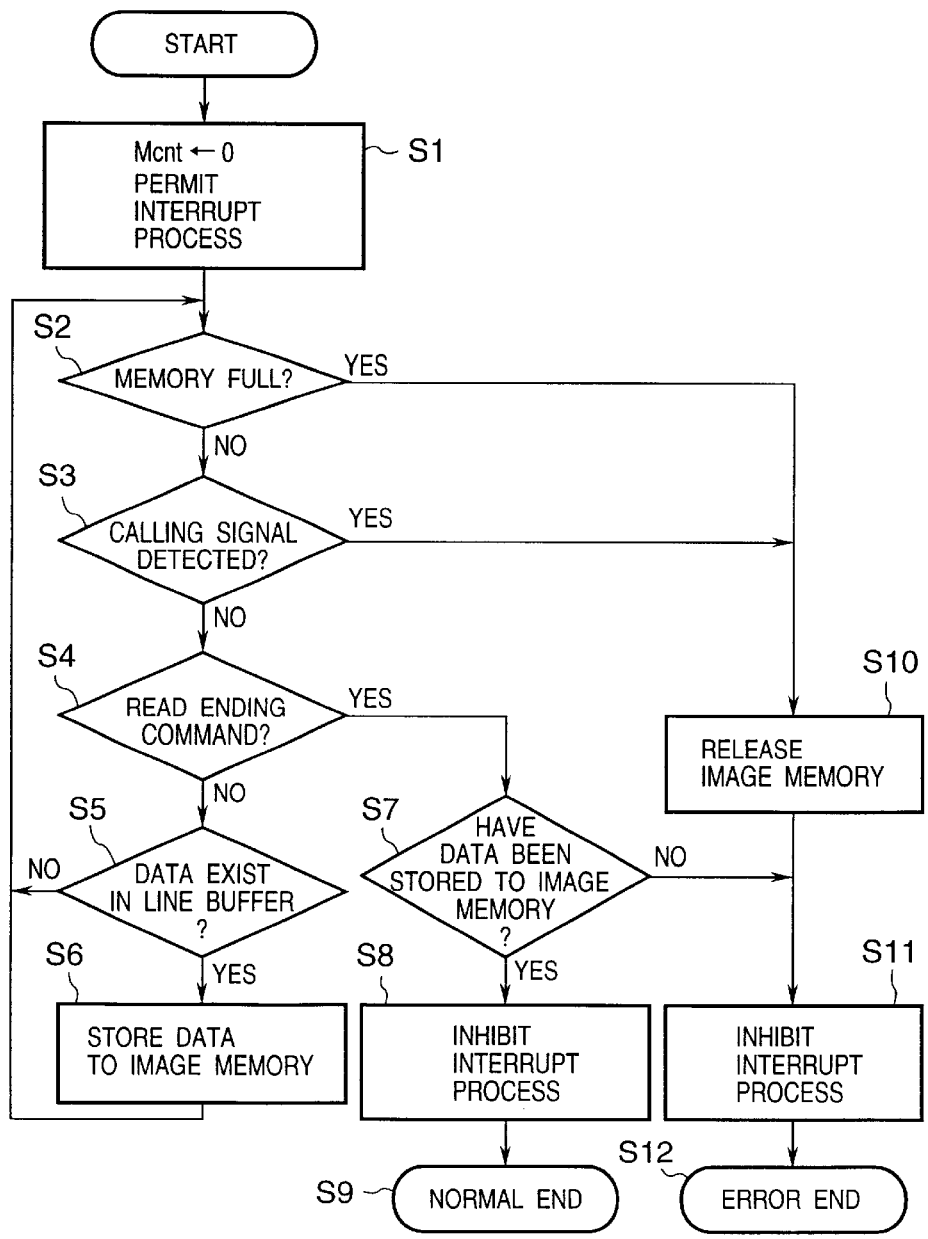
FIG. 5 is a flow chart showing a control at the time of reading out of a monochromatic image using a handy scanner to transmit monochromatic image data or to photocopy in the facsimile apparatus of the present embodiment.
Figure 6:
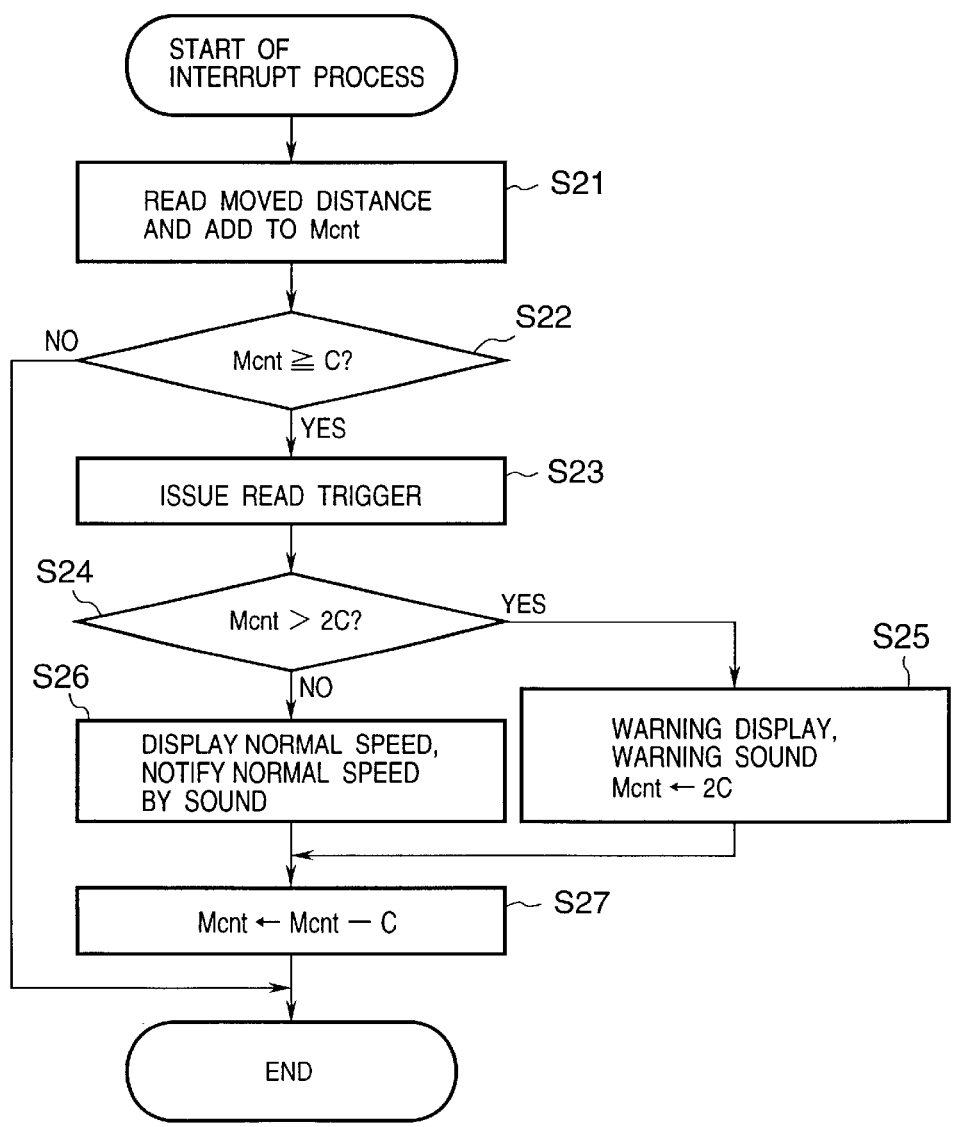
FIG. 6 is a flowchart showing an interrupt procedure to be executed concurrently with a procedure shown in the flow chart of FIG. 5, in the facsimile apparatus of the present embodiment.

FIG. 5 and FIG. 6 are flow charts showing a procedure of reading a monochromatic image for a monochromatic image-transmission or copying by using the hand-scanner 125 in the facsimile apparatus of the present embodiment. The program to execute the procedure is stored in the ROM 121, and is executed under the control of the CPU 11.

The read task 26 receives a read start command from the operate task 22, and then resets a movement counter Mcnt (which is provided in the SRAM 124) showing how far the hand-scanner 125 is traveling, and permits an interrupt to occur in every 2.5 m second (in step S1). The interrupt activates an interruption procedure shown in the flow chart of FIG. 6.

At the time of the operation, a user places the hand-scanner 125 on a manuscript, and moves the hand-scanner 125 in a desired reading direction and the encoder 116 rotates during the movement. Here, the output of the encoder 116 is set to be changed when the hand-scanner 125 travels for the distance equivalent to a line pitch of super fine mode, and thus, when the output of the encoder 116 changes, the encoder I/F unit 113 memorizes the number of changes of the output of the encoder 116.

FIG. 6 is a flow chart showing the interruption procedure taking place approximately in every 2.5 msec, and in accordance with the interruption in every 2.5 msec, at first at a step S21, the traveled distance of the hand-scanner 125 is read from the encoder I/F unit 113 at a read trigger timing, and the traveled distance is added to the movement counter Mcnt. And in a step S22, it is determined whether the value of the movement counter Mcnt is not less than a predetermined value C (namely "4" for a standard reading resolution in the sub-scanning direction, and "2" for fine mode) in accordance with the reading resolution. If affirmative, the process proceeds to a step S23 to issue a read trigger to the image processor unit 114. Next, in a step 24, and it is checked whether the value of the movement counter Mcnt is not less than twice (2C) the predetermined value C in accordance with the reading resolution, and if affirmative, proceed to a step S25, it is determined that the traveling speed of the hand-scanner 125 is too fast, and causes the display unit 36 of the console panel 122 to display (as concerns the contents of this display "scanner traveling too fast" is displayed as described before) and the speaker 18 to generate an alarm sound. In addition, at this time the value of the counter Mcnt is set at "2C."

On the contrary, when the value of the movement counter Mcnt is not more than "2C," the process proceeds to a step 26, and since the traveling speed of the hand-scanner 125 is appropriate, ("scanner speed >>>" is displayed as described before) is displayed and the speaker 18 generates a normal sound. After these steps S25 or S26, proceeds to a step S27, the value C is subtracted from the value of the movement counter Mcnt, and the image processor unit 114 performs an A/D conversion as well as an image processing of the image data scanned by the color contact sensor 112. The processed monochromatic image data is written in a line buffer of the DRAM 118 by the control of the DMA control unit 117.

The read task 26 supervises whether any image data have been written in the line buffer at a step S5 of FIG. 5, and if image data have been written therein, the process proceeds to a step S6, and the image data stored in the line buffer is transferred to the image memory of the same DRAM 118. When reading-out by the read task 26 is finished, the set key 310 of the console panel 122 is pushed so that at a step S4, the read end command is sent from the operate task 22 to the read task 26. With this, the process proceeds to a step S7, and according to whether there are any image data in the image memory of the DRAM 118, it is determined whether or not an image has been read by the HSU 125, and if the image has been read and the image data is stored, the process proceeds to a step S8 to prohibit an interrupt procedure, and to normally end the reading operation at the step S9. On the other hand, if the image data is not stored in the image memory at the step S7, the process proceeds to a step S11 to prohibit an interrupt procedure and to finish the reading operation as an error at a step S12.

In addition, when a state of memory full is occurred during reading of a manuscript at a step S2, or a call signal detecting circuit detects a phone call signal at a step S3, the process proceeds to a step S10, and releases the image memory, and prohibits an interrupt procedure at the step S11, and finishes the reading operation as an error at the step S12. The above described operation is performed, because if the image memory is full, then printing can not be performed and if a calling signal is detected, then the reception procedure is given priority.

The read task 26 informs the operate task 22 that the reading of a manuscript has been normally completed or finished in an error. In the case of normally completion, the operate task 22 issues the record start command to the recording task 29 and records the read image data if the copy operation is instructed. On the other hand, in the case of finishing in an error, a copying is finished without recording.

As for a controlling method on a transmission processing of monochromatic image using the hand-scanner 125 is similar to the above-described controlling method on a monochromatic image copying using the hand-scanner 125, and the different point is that after a manuscript image is read, a confirmation printing is instructed so that the recording task 29 is activated for confirmation and the record processing is implemented, and otherwise without implementing the recording operation activating the recording task 29, the transmission is taken place.

Figure 7:
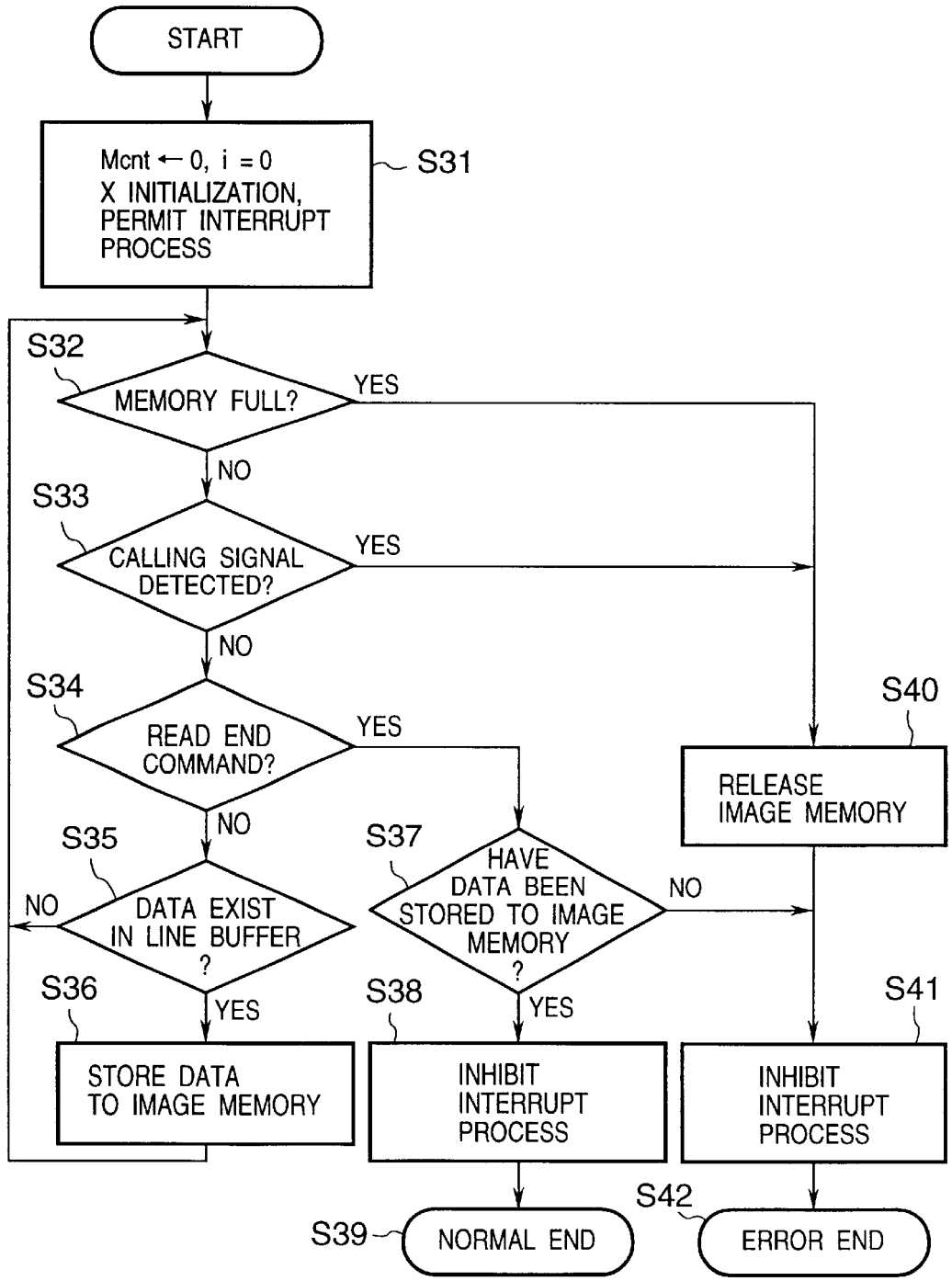
FIG. 7 is a flowchart showing control at the time of reading out a color manuscript using a hand-scanner at the time of color image copying in the facsimile apparatus of the present embodiment.
Figure 8:
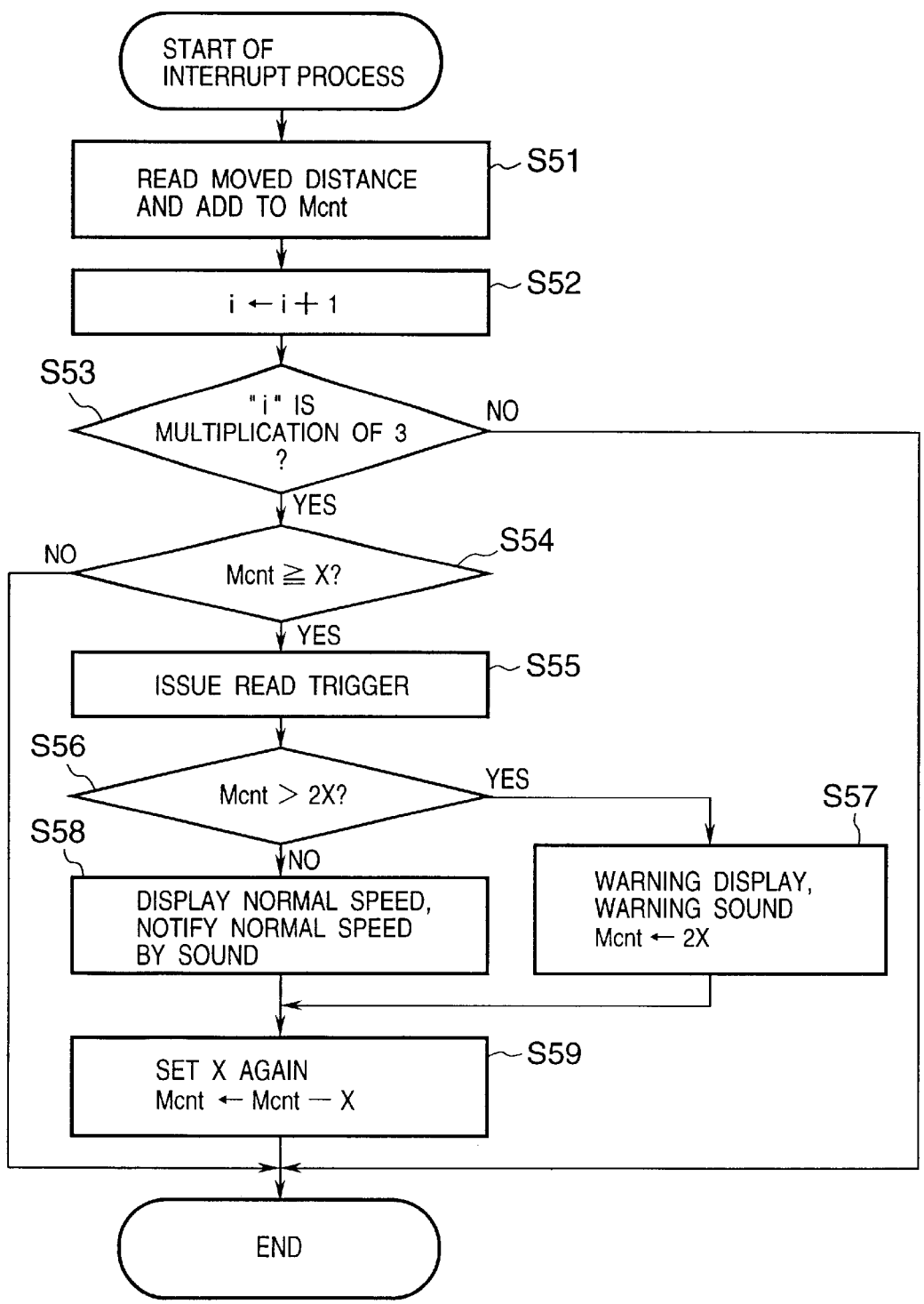
FIG. 8 is a flow-chart showing an interrupt procedure to be executed concurrently with a procedure shown in the flow chart of FIG. 7 in the facsimile apparatus of the present embodiment.

FIGS. 7 and 8 are flowcharts showing controlling at the time of reading of a color manuscript at the time of color image copying by using the hand-scanner 125 in the facsimile apparatus of the present embodiment. The program to execute this control is stored in the ROM 121 and is executed under the control of the CPU 11.

The read task 26 receives a read start command from the operate task 22, and at first at a step S31 resets at "0" the movement counter Mcnt (which is provided in the SRAM 124) showing how far the hand-scanner 125 is traveling, and in addition, resets at "0" a counter i (which is provided in the SRAM 124) to be described later, and initializes a read trigger issuing count value X (SRAM 124) to issue the read trigger when the value of movement counter Mcnt is not less than the read trigger issuing count value X, and allows an interruption to occur approximately in every 2.5 m second. This allows the interruption and drives the interruption procedure shown in FIG. 8.

Since the reading resolution in the sub-scanning direction at the time of color copying is 90 dpi, the read trigger issuing count value "X" is not a fixed value, and every time when one line of a manuscript is read, the value of the X needs to be set again at "4" or "5." Now a user places the hand-scanner 125 on a manuscript, and moves it in a desired reading direction, and the encoder 116 rotates during the movement. Here, the output of the encoder 116 is set to be changed when the hand-scanner 125 travels for the distance equivalent to a line pitch of a super fine mode, and when the output of the encoder 116 changes, the encoder I/F unit 113 memorizes the number of changing of the output of the encoder 116.

When an interrupt in every 2.5 m second occurs, process proceeds to a step S51, and the traveled distance of the hand-scanner 125 is read from the encoder I/F unit 113 at the read trigger timing, and the traveled distance is added to the movement counter Mcnt. Next, in a step S52, and "+1" is added to the value of the counter i. And at a step S53, it is determined whether or not the value of the counter i has become a number being a multiplication of "3", that is, whether the reading procedure of respective colors of RGB is completed or not, and if negative, the interruption procedure is ended. Incidentally, in this respective interrupt procedure, it is supposed that the read image of each color of RGB by a corresponding sensor (taking approximately 2.5 m second per a color) is being executed successively by the hardware, and the image data read by each sensor is held by the hardware.

Thus, when the value of the counter i at the step 53 becomes a number multiplied by "3," the process proceeds to a step S54 to determine whether the value of the movement counter Mcnt is not less than the read trigger issuing count value "X", and if affirmative, the process proceeds a step S55 to issue the read trigger to the image processor unit 114. This causes the image data of three colors of RGB to be inputted. Next, the process proceeds to a step S56 to check on whether or not the value of this movement counter Mcnt is not less than twice (2X) the read trigger issuing count value X, and if affirmative, goes to a step S57. In the step S57, since the traveling speed of the hand-scanner 125 is too fast, the display unit 36 of the console panel 122 displays to be "too fast", and in addition the speaker,18 generates a warning sound. In addition, the value of the counter Mcnt is set at 2X.

On the other hand, if in the step S56, the value of the movement counter Mcnt is not more than 2X, the process proceeds to a step S58 to treat that the traveling speed of the hand-scanner 125 is appropriate and to cause to display being appropriate and to cause the speaker 18 to make a normal sound. And, after execution of the steps S57 or S58, the process proceeds to a step S59 to subtract the read trigger issuing count value X from the value of the movement counter Mcnt, and to set the read trigger issuing count value X again for a succeeding line.

Thus, the image processor unit 114 performes an A/D conversion as well as image processing on the image data scanned by the color contact sensor 112. Thus, the processed color image data is written in order of RGB to the line buffer of the DRAM 118 under the control of the DMA controller 117.

Now back to the flow chart in FIG. 7, the read task 26 supervises whether image data have been written in the line buffer of the DRAM 118 at a step S35, and if image data is written in the line buffer, the process proceeds to a step S36 to transfer the image data in the line buffer to the image memory of the DRAM 118. In order to finish the reading by using the hand-scanner 125, a user depresses the set key 310 on the console panel 122 to transmit the read end command from the operate task 22 to the read task 26. By depressing the set key 310, the read end command is detected and the process to proceed from the step S34 to a step S37. In the step S37, it is determined whether or not image data of a manuscript has been stored, and if the image data having been stored, the process proceeds to a step S38 to prohibit an interrupt procedure and to go to a normal conclusion of the reading operation at a step S39. On the other hand, if the image data has not been stored, the process proceeds to a step S41 to prohibit the interrupt procedure and proceeds to an error conclusion of the reading operation at a step S42.

In addition, when the image memory is saturated while reading an image at a step S32 or any call signal is detected by the call signal detecting circuit at a step S33, the process proceeds to a step S40 to release the image memory of the DRAM 118, and then goes to the step S41 to prohibit the interrupt procedure and goes to an error conclusion of the reading operation at the step S42.

Hereafter, the read task 26 notifies the operate task 22 of whether the reading operation has come to a normal end (S39) or to an error end (S42). This causes the operate task 22 to instruct the record task 29 to issue the record start command and to record the read color image data if a copying has been instructed, in the case of the normal conclusion. On the other hand, for the error conclusion, without recording the image data, a copying operation comes to an end if a copying has been instructed.

The controlling method on transmission processing of a color image using the hand-scanner 125 is also similar to the above-described controlling method on the color copying using the hand-scanner 125, and the different point is that after the reading operation is performed, and when a confirmation printing is not instructed (that is, "not do" is chosen for confirmation printing), without implementing the recording operation by the recording unit 120, the transmission operation is taken place.

[Color Image Transmission by Using the Hand Scanner]

Figure 10:
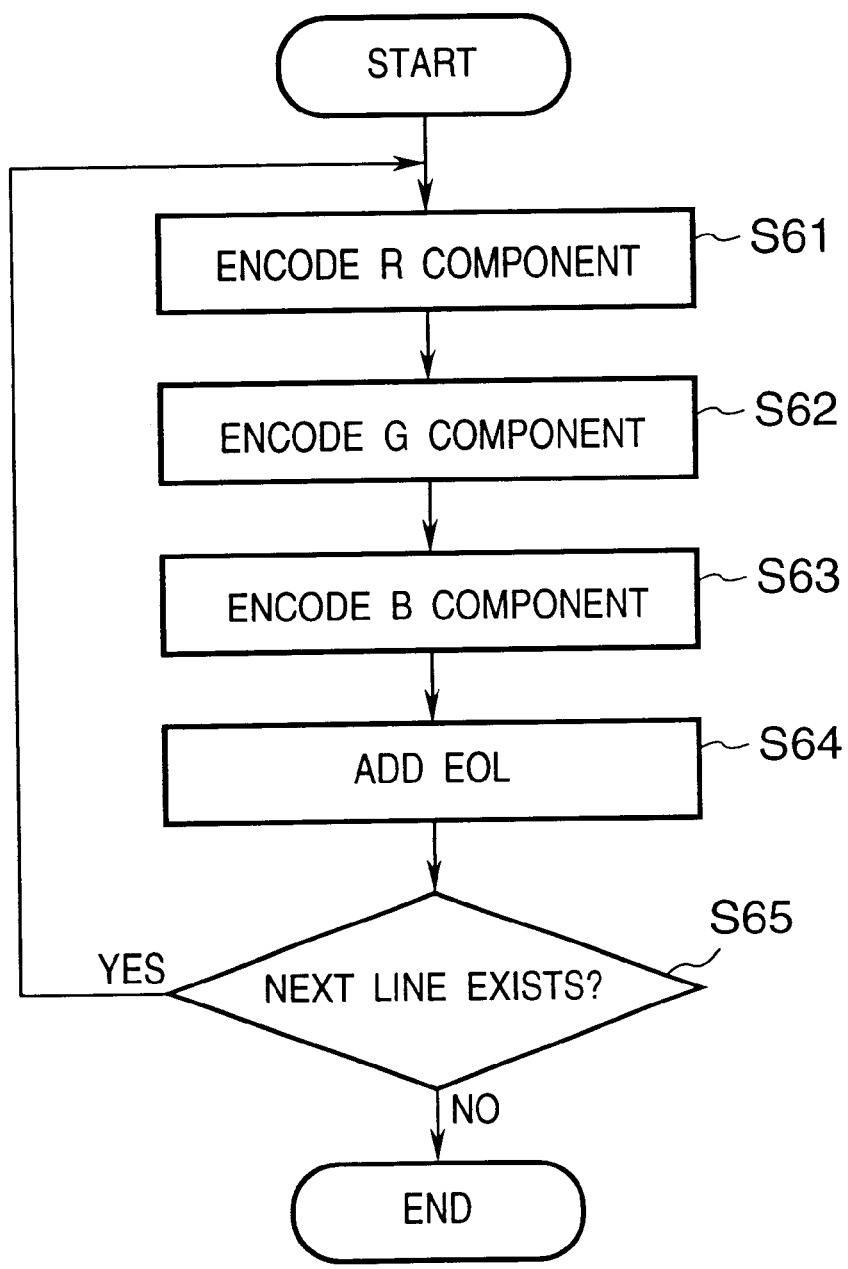
FIG. 10 is a flow chart showing a coding procedure at the time of transmitting a color image.

Next, a coding procedure will be explained at the time of a color image transmission by using the hand-scanner 125. FIG. 10 is a flow chart showing the coding procedure, and the program to execute the procedure is stored in the ROM 121 and is executed under the control of the CPU 11.

Figure 9A:
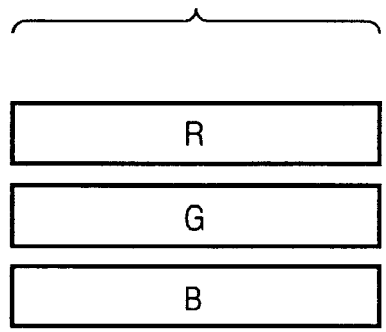
FIG. 9A and FIG. 9B are diagrams for explaining RGB data and a data coding format thereof.

Upon receipt of a coding start command from the communication task 25, the coding/decoding task 27 reads out the image data stored in the image memory in one line basis in order of RGB (see FIG. 9A), and encodes respectively by a known coding processing with DPCM as a base (in steps S61, S62, and S63).

Figure 9B:

Thereafter at a step S64, EOL (End of line) code of Huffmann coding is added (see FIG. 9B), and written in a communication buffer of the DRAM 118. And at a step S65, if there exist image data on a succeeding line, the aforementioned coding processing is repeated.

[Color Image Transmission by Sheet-scanning]

Next, a coding will be explained at the time of a color image transmission by sheet-scanning (automatic reading of a manuscript under state that the hand-scanner 125 is mounted on the apparatus).

Figure 11:
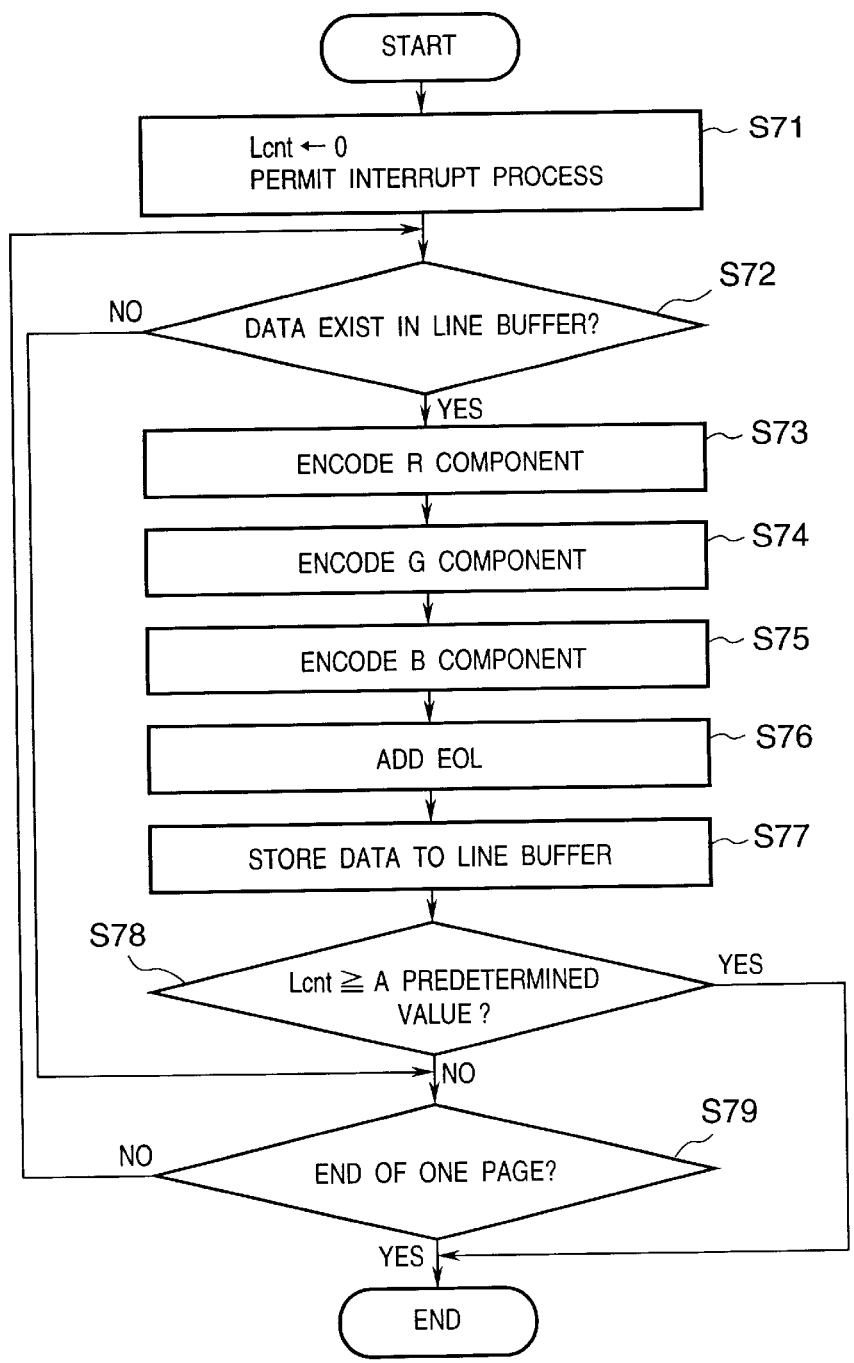
FIG. 11 is a flow chart showing a procedure from reading out to transmitting a manuscript image by a sheet scanning.
Figure 12:
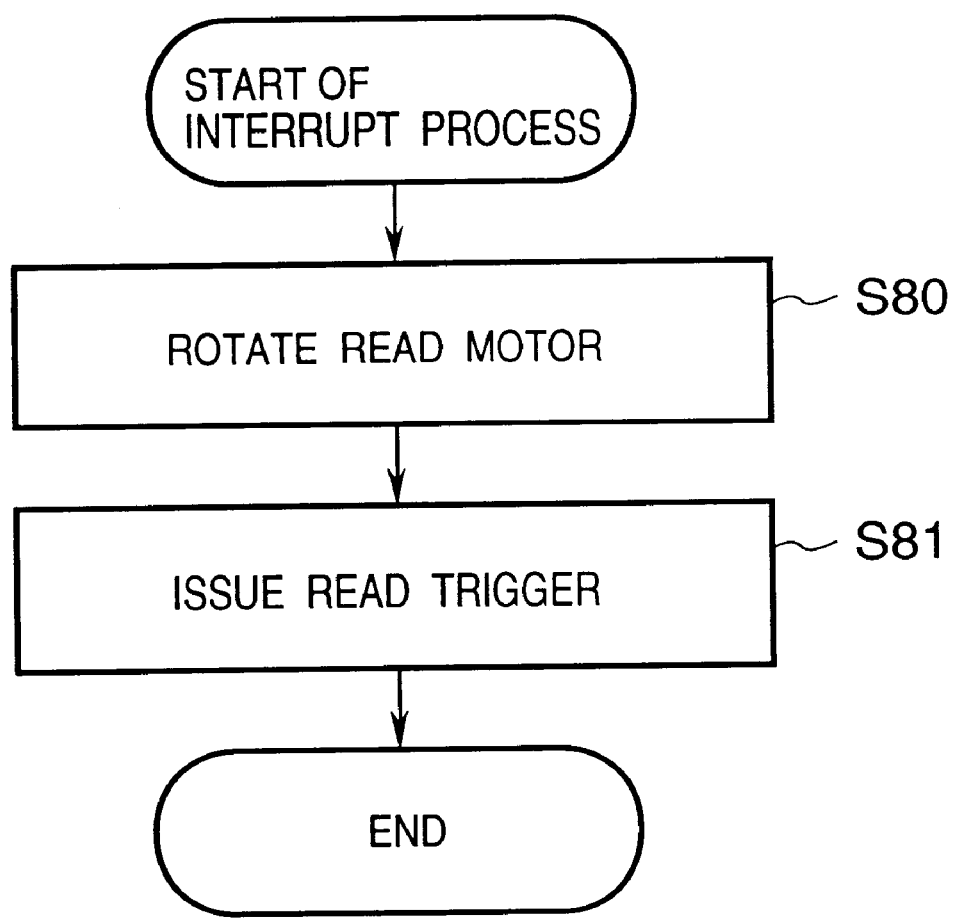
FIG. 12 is a flow chart showing an interrupt procedure to be executed concurrently with a procedure in FIG. 11.

FIG. 11 is a flow chart showing a processing to read as well as transmission of a manuscript image by the sheet-scanning and FIG. 12 is a flow chart showing an interrupting procedure, and the controlling program to execute the procedure is stored in the ROM 121 and is executed under the control of the CPU 11.

The coding/decoding task 27 receives the coding start command from the communication task 25, and at a step S71 resets a read line counter Lcnt at "0," and allows an interruption to occur approximately every 2.5 m second.

This enables the interruption and causes the processing shown in FIG. 12 every time when the interruption occurs.

At a step S80 in FIG. 12, while the read motor (not shown) is driven to rotate at a read trigger timing by the interruption processing occurred every 2.5 m second, the read trigger is issued to the image processor unit 114 (at a step S81).

This causes the image processor unit 114 to implement an A/D conversion as well as an image processing on the image data scanned and read by the CS 112. Thus, the processed color image data is written to the line buffer of the DRAM 118 in order of RGB color components by the DMA controller 117.

Accordingly, at a step S72, the coding/decoding task 27 determines whether or no the image data have been written to this line buffer, and if the image data have been written, the image data are coded by a known coding processing with DPCM as a base (at steps S73 through S75). And at a step S76, EOL (End of line) code of Huffmann coding is added (see FIG. 9B). And at a step S77, the coded data is written in a communication buffer of the DRAM 118., and +1 is added to the read line counter Lcnt. Next, the process proceeds to a step S78, and it is determined whether or not the value of the read line counter Lcnt exceeds a predetermined value, and if affirmative, the processing gets over. On the other hand, if negative, the process proceeds to a step S79 to check on whether or not the coding of the image data of one page is completed, and if negative, the process returns to the step S72 to execute the aforementioned processes, and if it is detected that the coding of the image data of the page is completed, the coding procedure is over.

[Decoding of Color Image Data]

Figure 13:
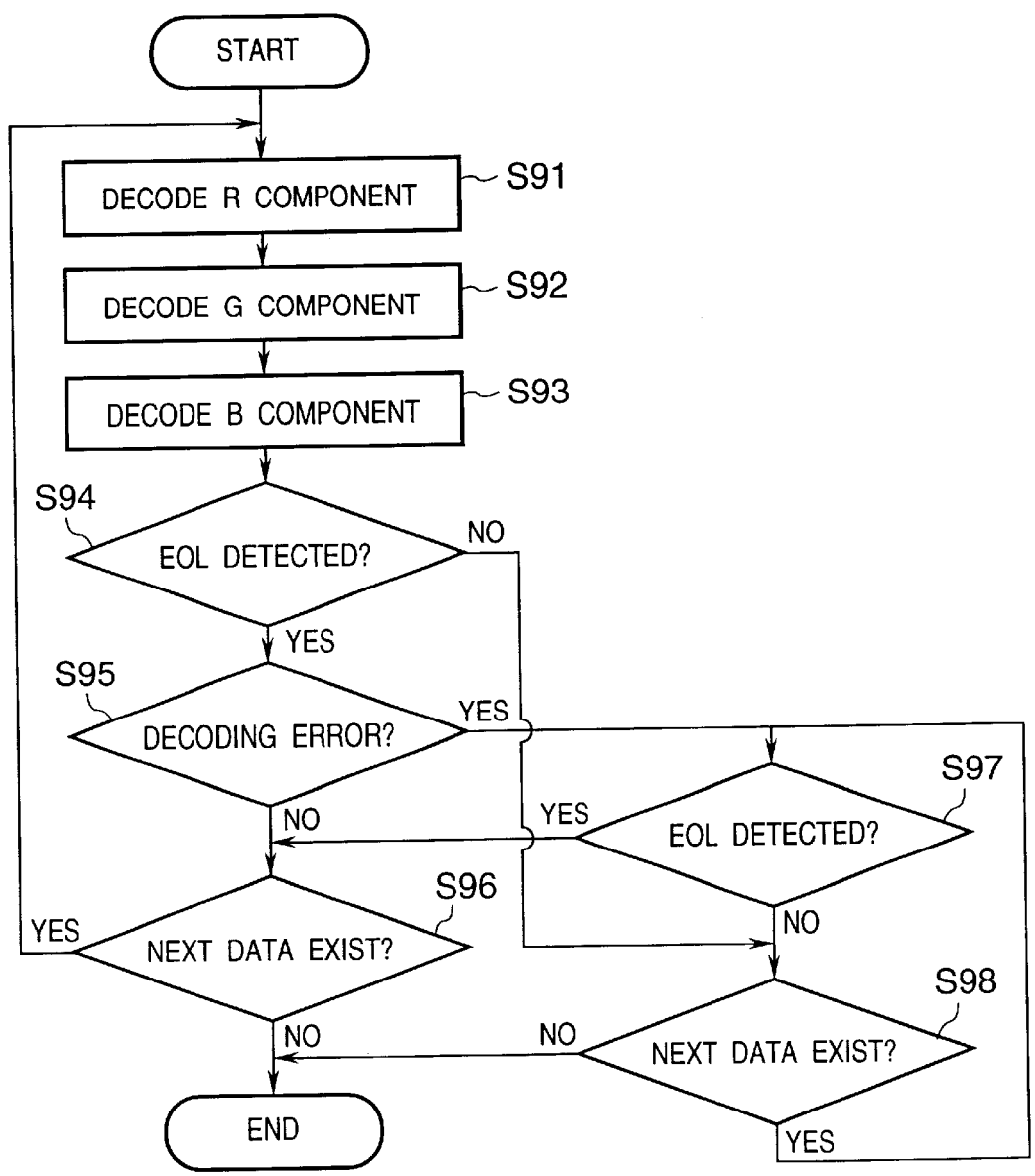
FIG. 13 is a flow chart showing a decoding procedure of color image data.

The coding at the time of a transmission of a color image has been explained, and next the decoding of a received color image will be explained. FIG. 13 is a flow chart showing a decoding processing of color image data, and the program to execute the procedure is stored in the ROM 121 and is executed under the control of the CPU 11.

The coded image data stored in the image memory of the DRAM 118 is read and proceeded with decoding in order of RGB by a known decoding procedure with DPCM as a base (see steps S91 through S93). The decoded image data is stored in the line buffer of the DRAM 118 on RGB color components basis, respectively. Since the coded image data includes the EOL code of Huffmann coding after a color B component as mentioned before, it is checked on whether or not the EOL code is detected at a step S94. If the EOL code is not detected successfully, the process proceeds a step S98, and the EOL code is searched until the EOL code is detected at the steps S98 and S97.

If the EOL code is detected at s step S94, and there are no decoding errors at a step S95, and further there exist next data at a step S96, the process proceeds to the step S91 and the decoding process on the next line is implemented similar to the process described before.

On the other hand, when the EOL code is not detected and the image data have come to an end during searching the EOL code at the steps S98 and S97, the decoding process will come to an end at the step S98. And even if an error is detected in the course of decoding at the step S95, likewise in the case where the EOL code is not detected successfully, the process proceeds to the step S97, and if the next EOL code can be detected, the process proceeds to the step S96 and it can return to the procedures as shown by the steps S91–S96 by the next line. With the decoding processing being repeatedly implemented until the end of the coded image data, the decoding processing of the received images is completed.

Next, an operation on the communication program of a color image communication utilizing BFT (Binary File Transfer) subject to ITU-T recommendation, by the facsimile apparatus of the present embodiment, will be explained.

The BFT is a method of transmission on an error-free basis with a file such as a binary file and a file created by a personal-computer, etc. being carried on the ECM transmission protocol.

Such operation procedure will be explained with reference to FIG. 14 through FIG. 17.

Figure 14:
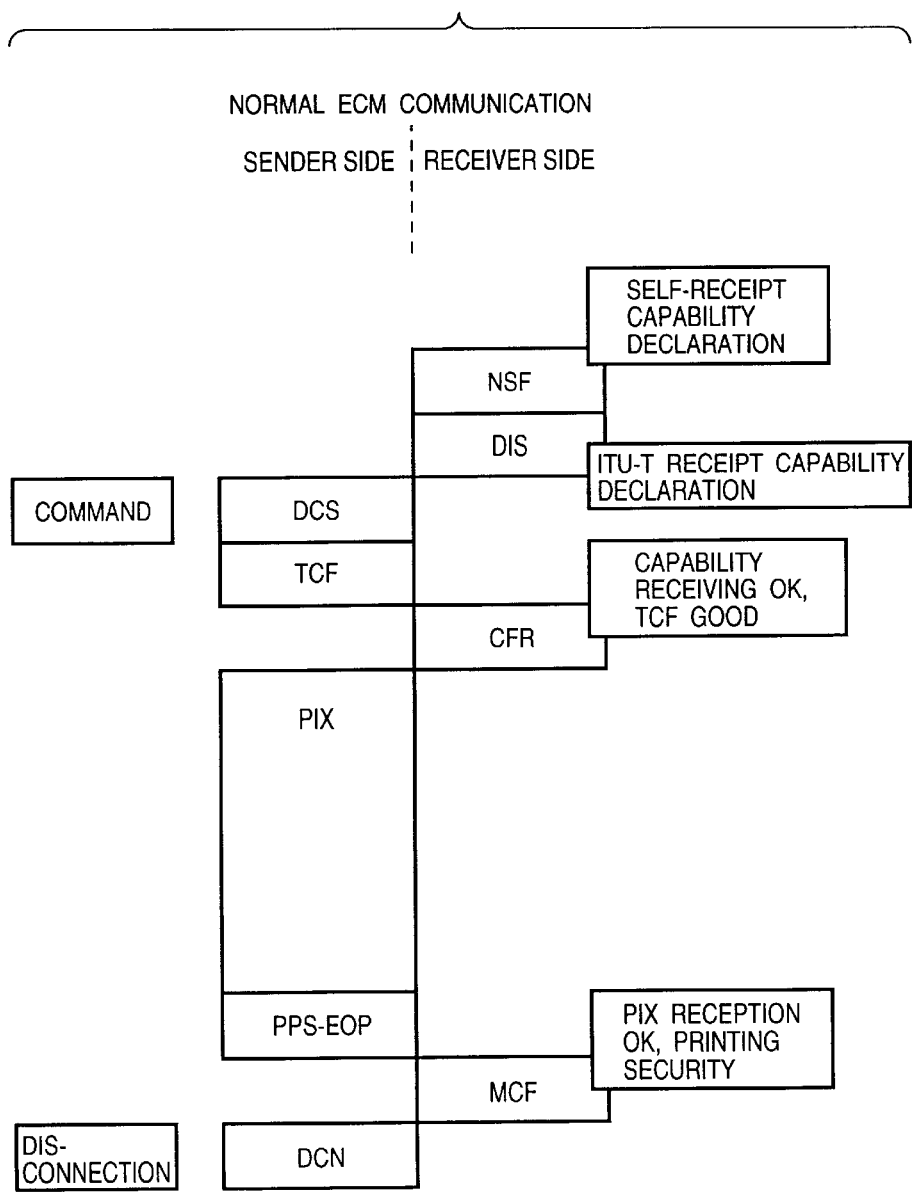
FIG. 14 is a diagram explaining a procedure of a normal ECM communication.

FIG. 14 is a diagram explaining a procedure in the normal ECM communication.

A facsimile apparatus of a receiver side declares a receiving capability of its own with the NSF (non-standard signals), and declares the receiving capability with respect to the ITU-T with a digital identification signal (DIS). This causes a sender side to transmit a digital command signal (DCS) and a training check (TCF), and the receives side transmits a confirmation signal for a receipt preparation (CFR) by return. Thus, in receipt of a facsimile image signal (PIX), the completion of reception of PIX signal and the message on being capable of printing is notified to the sender side with a message confirming signal (MCF) to a procedure interrupt signal (PPS-EOP). And from the sender side, a disconnecting command (DCN) is transmitted and the ECM communication ends.

Figure 15:
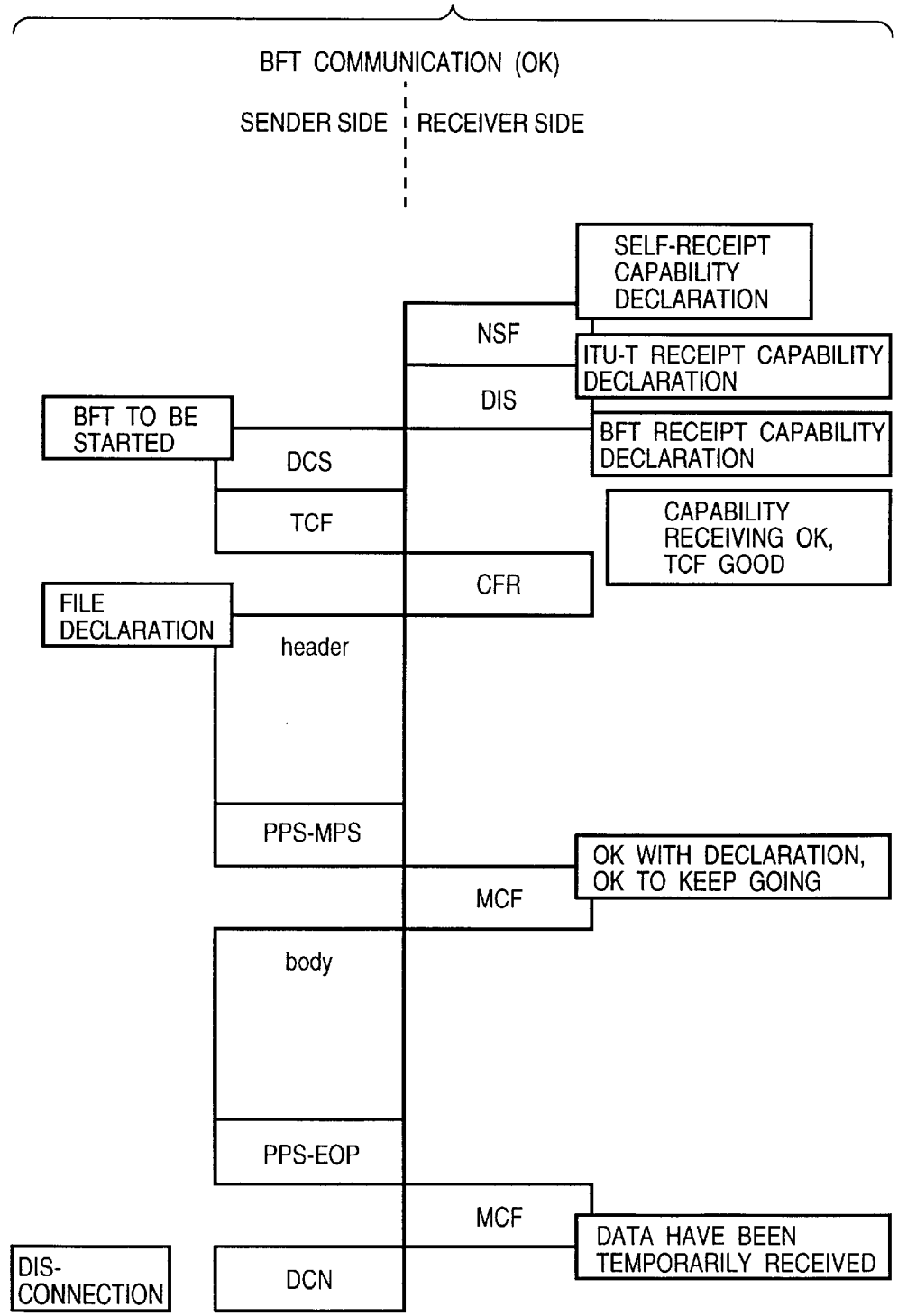
FIG. 15 is a diagram for explaining a (normal) procedure of BFT communication.

FIG. 15 is a diagram explaining the communication procedure (the normal communication) in the BFT communication.

The facsimile apparatus at a receiver side declares the reception capability of its own with the NSF (non-standard facility signal), and declares having the receiving capability of the ITU-T with the digital identifying signal (DIS). This causes a sender side to instruct commencement of the BET communication with the digital command signal (DCS) for transmitting the training check (TCF) and the receiver side transmits the confirmation signal for a receipt preparation (CFR) by return. This causes the sender side to declare which file to transmit and then transmit a header. Thus, in receipt of the interrupting signal (PPS-MPS), the message confirming signal (MCF) notifies that the proceeding is feasible. This successively causes the sender side to transmit a body of the image data. And when the interrupting signal (PPS-EOP) of the image data is transmitted, the message on the completion of reception and readiness of printing is transmitted to the sender side. And from the sender side, the disconnecting command (DCN) is transmitted and the ECM communication normally ends.

Figure 16:
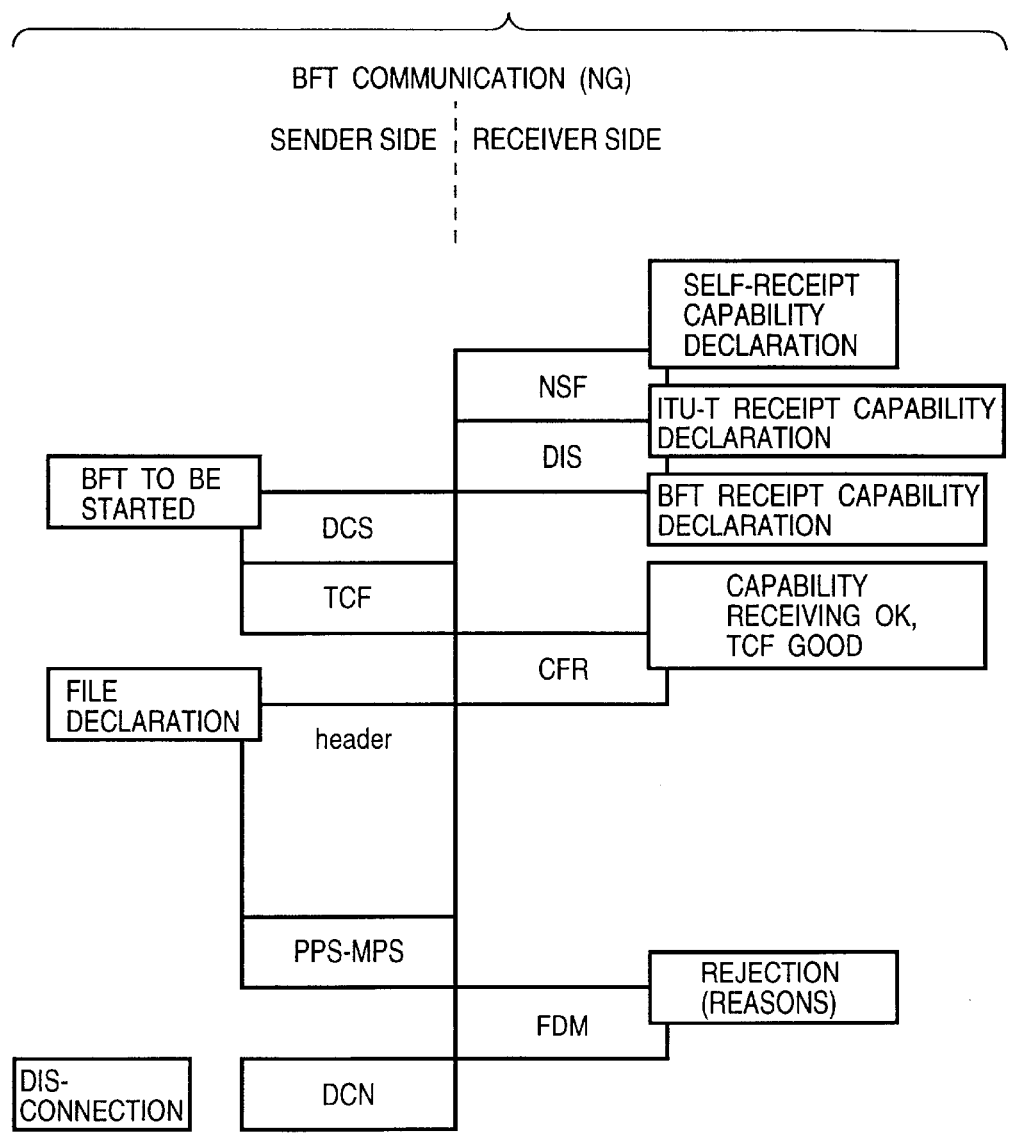
FIG. 16 is a diagram for explaining a procedure of BFT communication (end due to rejection)

FIG. 16 is a diagram explaining a communication procedure (the rejection) in the BFT communication. In the example of FIG. 16, a receiver side receives the header and in receipt of the interrupting signal (PPS-MPS), the reception rejecting signal (FDM) notifies to the sender side that the proceeding of reception is not feasible.

As the reasons of this rejection, for the receiver side, the following reasons may be enlisted:

(1) it is not capable of a designated compression and elongation (coding and decoding).

(2) it cannot print an image with a designated main scanning width.

(3) it cannot store image data into a memory in a designated file size.

(4) it cannot print an image with a designated dot unit system.

Figure 17:
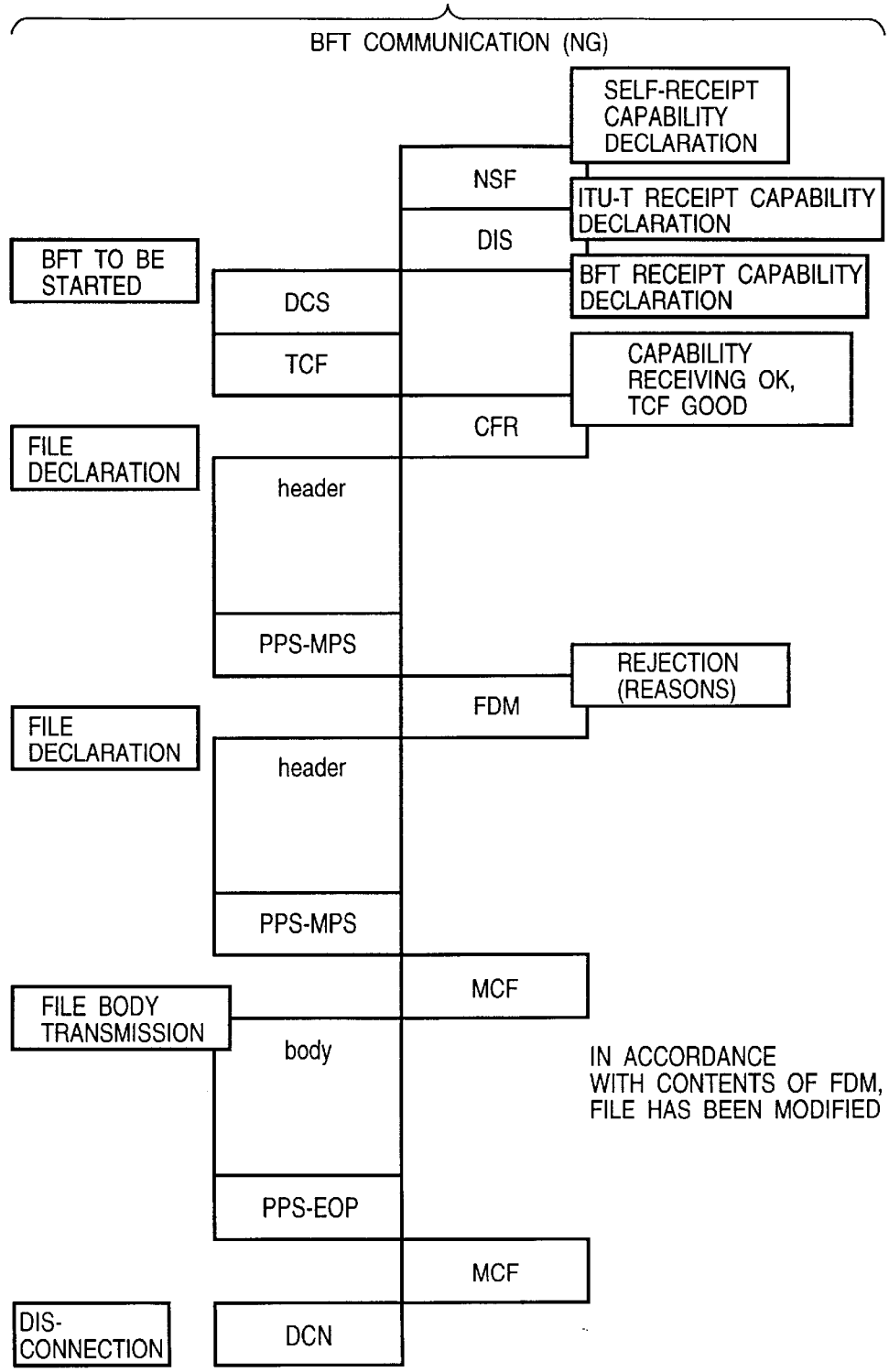
FIG. 17 is a diagram for explaining a procedure of BFT communication (return from rejection)

FIG. 17 is a diagram explaining a communication procedure (the procedure from the rejection to recovery) in the BFT communication.

In an example in FIG. 17, the procedure is the same as that in FIG. 16, regarding that the receiver side receives the header and in receipt of the interrupting signal (PPS-MPS), the reception rejecting signal (FDM) notifies to the sender side that the proceeding of reception is not feasible.

After then, the sender side analyzes a reason of the rejection returned with the FDM signal, and the sender side modifies the file format and again declares on the file having undergone modification and sends the header as well as the body of the new file format to the receiver side. This causes the receiver side to receive the file and transmit the message on the completion of reception of the file and readiness of printing (MCF) to the sender side. After then, the disconnecting command,(DCN) is transmitted from the sender side and the ECM communication gets normally over.

FIG. 18 shows a diagram explaining the BFT header information in accordance with the ITU-T recommendation. In FIG. 18, 1800 indicates the BFT header information to be used at a communication of color image in the facsimile apparatus of the present embodiment.

The facsimile apparatus of the present embodiment uses a simple BFT which is the procedure to execute the BFT communication, and only transmits a header of a file (see FIG. 19) to a receiver side in advance, and upon receipt of an affirmative response (MCF signal) from the receiver side, transmits the succeeding part of the file (the body information). Thus, the apparatus follows the communication procedure of the ITU-T recommendation. In the present embodiment, the apparatus creates a file based on color image data generated by the DPCM compression method in the coding/decoding task 27, and can transmit the file with the protocol of the simple BFT.

FIG. 20 is a diagram showing a format of a signal (FDM signal) transmitting a reason for rejection to be returned from a receiver side to a sender side in FIG. 17.

In FIG. 20, reference numeral 201 denotes a first octet expressing a stylized message in a bite, and in the apparatus of the present embodiment, "no reasons" is set in the first octet Reference numeral 202 denotes a second octet and optional information is set there. In the apparatus of the present embodiment, using "Diagnostic Information" on and after a third octet 203, information on rejection reason as listed below is set:

(1) incapable of a designated compression and elongation "No Compatible Compression"

(2) main scanning width is not printable "Illegal Horizontal Size"

(3) volume of file is too large "File Too Large"

Figure 21A:
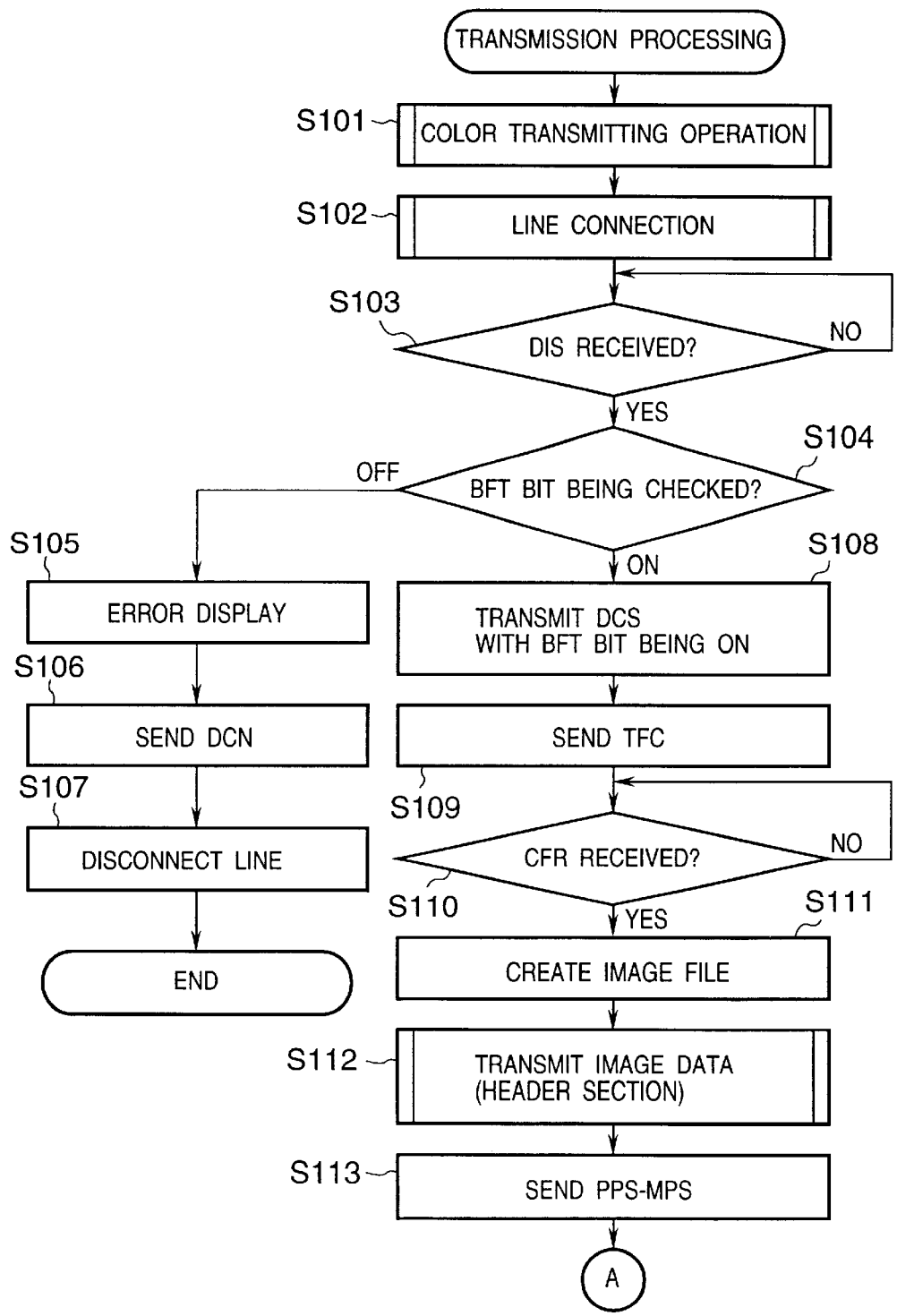
FIGS. 21A and 21B are flow charts showing a transmitting process in the facsimile apparatus of the present embodiment.
Figure 21B:
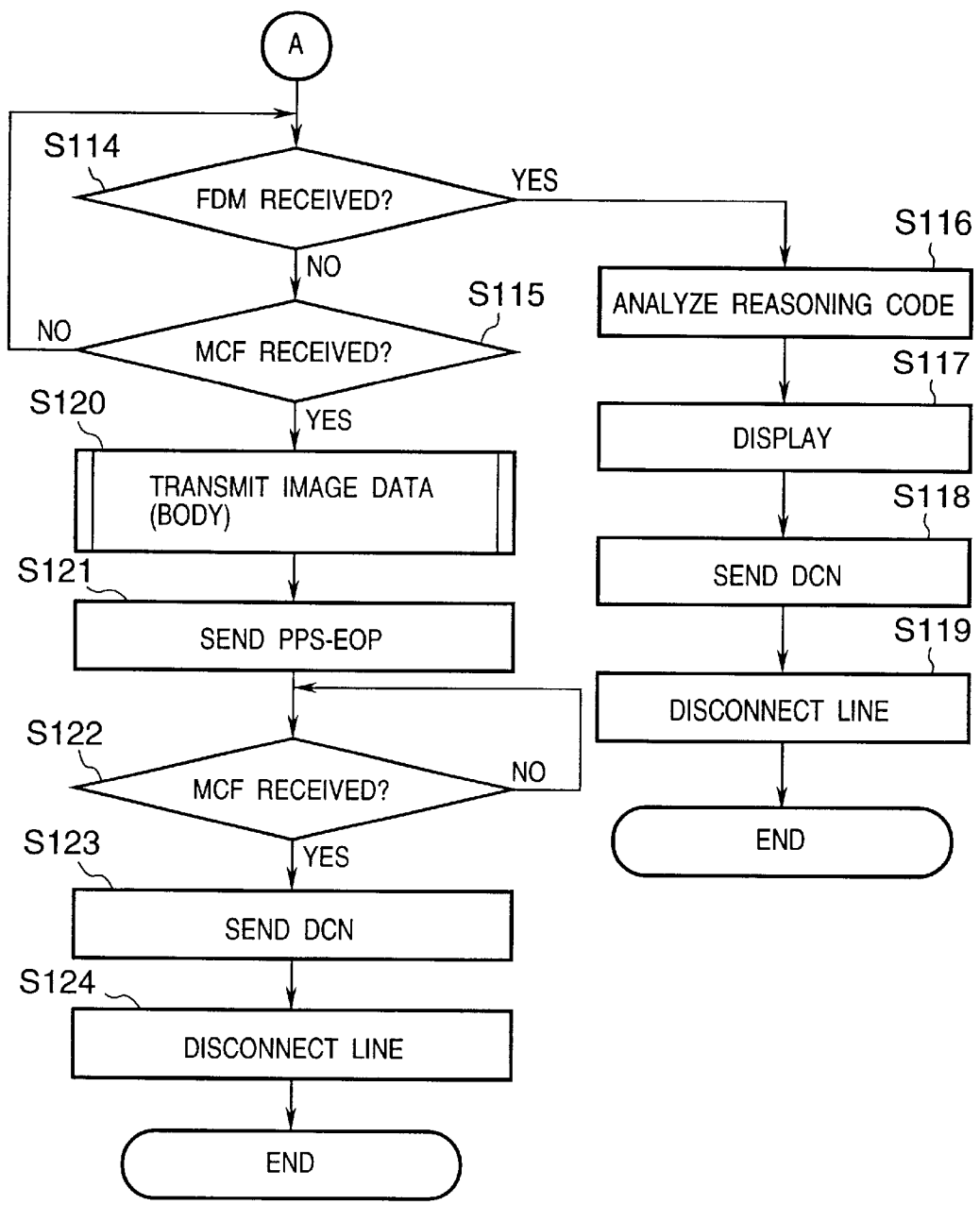

FIGS. 21A and 21B are flow charts showing a transmission operation of a color image in the facsimile apparatus of the present embodiment, and the program to execute the processing is stored in the ROM 121, and is executed under the control of the CPU 11. The program to execute the transmission operation of color image in the present embodiment is actually configured in multitask as shown in FIG. 2, but here, for the object of simplification, will be explained in accordance with the flow charts in FIGS. 21A and 21B.

At first, a transmitting operation of a color image is instructed at a step S101, which is detected in the status supervising task 21 and drives the line control task 23. This causes the line control task 23 is driven at a step S102 to connect the line to implement the calling operation to the instructed destination as well as to drive the communication task 25. Next, the process proceeds to a step S103, and the communication task 25 determines whether or not the initial identification signal (DIS signal) specified by the ITU-T T.30 is received from a receiver side, and upon receipt of the DIS signal, the process proceeds to a step S104, and the transmission task 25 determines whether or not the receiver side has the binary file transfer (BFT) communication procedure specified by the ITU-T T.30.

In the present embodiment, the DIS signal of the ITU-T T.30 is adopted to determine whether or not the receiver side has the BFT mode at the step S104, but in the case where more rapid communication is desired, an Ansam signal of the known ITU-T V.8 procedure may be detected, and thereafter the CM signal is transmitted so that the process proceeds to the V.34 procedure to know the capability of the receiver side.

When the receiver side does not have the BFT communication procedure at the step S104, it is determined that the communication on color image with the receiver side is not feasible, and the process proceeds to a step S105, and the error is displayed to inform an operator of the apparatus, and next at a step S106, the line disconnecting signal (DCN signal) is transmitted to the receiver side to perform the line disconnecting process (at a step S107).

On the other hand, in the case where the receiver side has the BFT mode at the step S104, the process proceeds to a step S108 to start a transmitting operation since the image record delivered includes a transmission request. If a color image bit on the image record is set, for the object of transmitting the color image as the protocol mode of the BFT communication, the simple BFT bit of the reception commanding signal (DCS signal) specified by the ITU-T T.30 is set "ON" to transmit the DCS signal to the receiver side. In this occasion, bits expressing resolution, coding method, and manuscript size on the DCS signal are declared respectively as a standard, an MH codes, and A4 width which are regarded as indispensable regardless of resolution, coding method, and the main scanning width on the color image to be transmitted in the BFT mode. It gives rise to this that these bits of the DCS signal are not allowed to be omitted under the ITU-T T.30 recommendation. Due to no relationship with the image to be transmitted in BFT, without being limited to the foregoing, the specification may comprises a superfine, an MMR coding, A3 width, etc. Thereafter, the training signal (TCF signal) of modem is transmitted at a step S109, and it is determined at a step S110 whether or not the confirmation signal for a receipt preparation (CFR signal) is received from the receiver side. When the CFR signal is received, the process proceeds a step S111, and the coding/decoding task 27 is activated so that an image file is created.

Here, creation of the BFT file header as well as creation of the file body obtained by the DPCM coding color image is implemented and the operation enters to deliver them to the receiver side, as shown in FIG. 19.

Next, creation of file names will be explained.

A file name is supposed to be exchanged in a personal computer, etc., and is created so that the same file name will not be used. The apparatus of the present embodiment comprises a numerical counter which is prepared inside and counts incrementally every time transmission takes place, and the counted value of the counter is converted into a character string, which can be used as a file name. In addition, as a file name, a fixed pattern such as "a happy birthday" or "thank you" etc. is made ready for a user's selection at the time of transmitting instruction. The selected name may be treated as the file name, "thank you. CDP." Moreover, the character string may be automatically generated from date and time information, etc. to be treated as a file name. For the apparatus of the present embodiment, these are combined and are considered so that each communication exchange may give rise to a unique file name. For example, in FIG. 19, a file-name "thank you xxx yyy. CDP" for example is shown, and there, xxx is filled in with time information, and yyy is filled in with the incremental value of the counter.

Moreover, resolution of the color image, coding method, and manuscript size, etc. to be actually transmitted in the BFT mode are created here as the header information. Herein, both the main scanning and the sub-scanning resolution is 90 dpi being a quarter of a printer resolution of 360 dpi which is proliferated for family use, and the coding method is the DPCM coding method, and the image size is with 360 mm width and 540 mm length which accepts a photograph L size, a color image size being proliferated for family use, and an official postcard, etc. None of these resolution, coding method, and manuscript sizes are specified in the ITU-T T.30. Here, it is adopted that none of these resolution, coding method, and manuscript size are specified in the ITU-T T.30, but only any one of them may be the one which is not specified in the ITU-T T.30. Since the receiver side operates in such a manner so that header information such as a file name, etc. is printed as a footer of a reception image, which becomes an ID on the received color image, and a very effective managing information for user.

Next, at a step S112, the file name as well as name extension is treated as the header information of the BFT and transmitted as rapid data of the ECM, and in succession, at a step S113, the PPS-MPS signal is transmitted so as to transmit the file body. As explained in the following reception operation, if there exist no problems, the MCF signal will come by return from the receiver side, and if there exists any problem, the rejection-reasons, etc. in the FDM signal will come by return.

When the FDM signal is received at a step S114, the process proceeds to a step S116 where the reason for that rejection is analyzed and at a step S117, the reason of the error is displayed by an error code. Looking at the error code, the user at the sender side can understand the reason such as whether or not the receiver side is in such a state that it can not implement reception due to a full memory or why an image attribute transmitted in the header information can not be processed. Thereafter, the DCN signal is transmitted to the receiver side at a step S118, and the line is disconnected at a step S119.

On the other hand, when the MCF signal is received at the step S115, the process proceeds to a step S120, and the coding/decoding task 27 keeps on coding the image data (readout data) in the DPCM method to deliver the image data to the communication task 25 so that the communication task 25 transmits the image data to the receiver side. Next, the process proceeds to a step S121 and the PPS-EOP is transmitted, and at a step S122, upon receipt of the MCF signal from the receiver side, the DCN signal is transmitted at a step S123, and the line is disconnected at a step S124.

Here, a procedure has been described to transmit to the receiver side the attribute information on the image not specified by the ITU-T T.30 with use of header information in a phase transmitting the image data as per the BFT procedure, and without using the nonstandard procedure, but without being limited to the BFT, also in the case of having used the JPEG and JBIG, etc., such a procedure may be taken that transmits to the receiver side the attribute information on the image not specified by the ITU-T T.30 with the header in the phase transmitting the image data succeeding the DSC signal, and without using the nonstandard procedure. Incidentally, in this case, at a step S104, it is altered to a step so as not to check on whether or not the receiver side has the BFT capability by receiving the DIS signal, but so as to determine whether or not it is capable of receiving JPEG or JBIG. In addition, the step S108 is altered so as not the put "ON" the BFT bit but so as to put "ON" the bit of JPEG or JBIG.

Next, explained in detail is the communication operation at the time of reception of a color image or a monochromatic image in the facsimile apparatus of the present embodiment. Incidentally, the transmission operation of color image in the present embodiment is actually executed in multitask as shown in FIG. 2, but here for the object of simplification will be explained in accordance with the flow chart in FIG. 22.

Figure 22A:
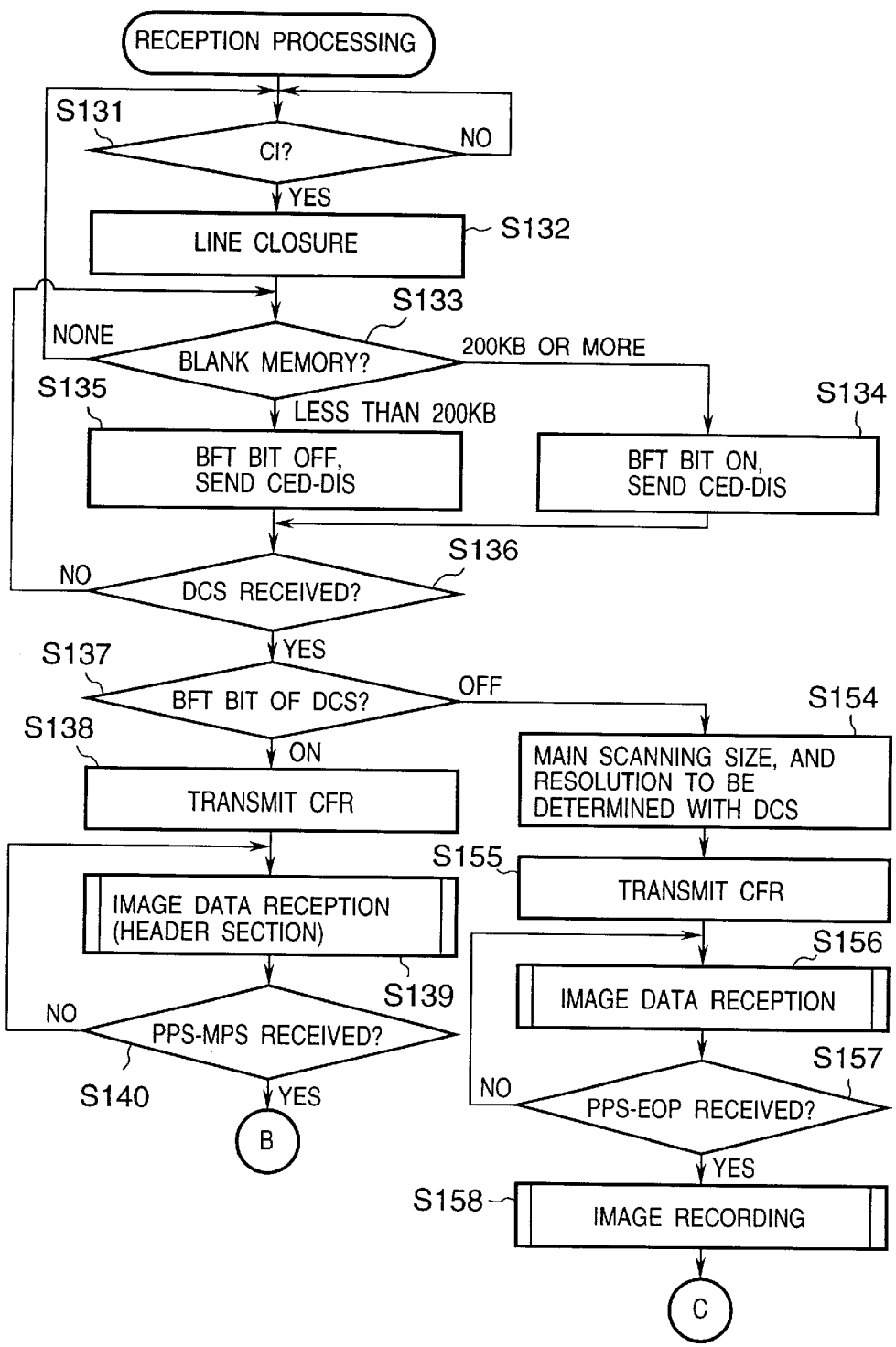
FIGS. 22A and 22B are flow charts showing a receiving process in the facsimile apparatus of the present embodiment.
Figure 22B:
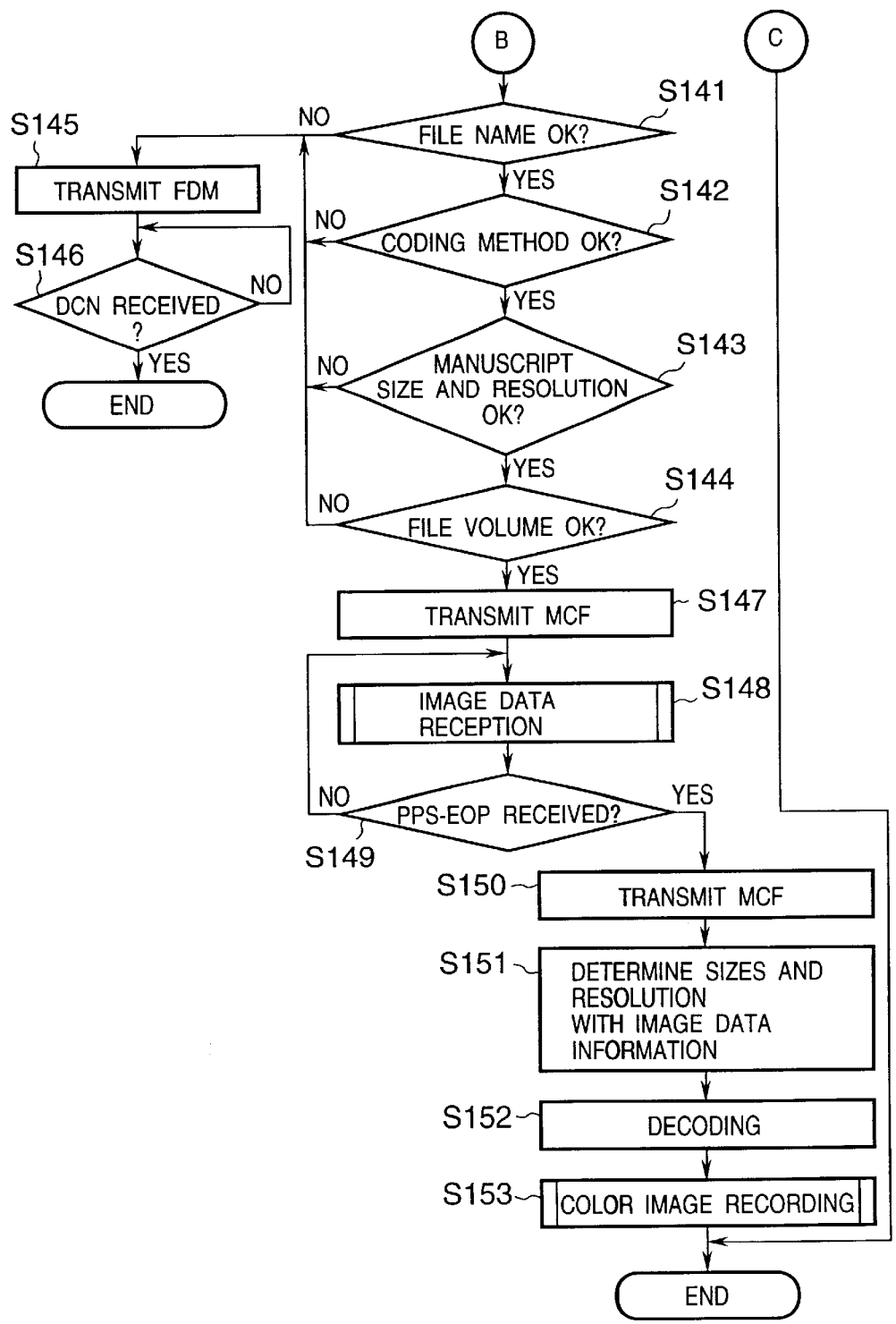

FIGS. 22A and 22B are flow charts showing a communication operation at the time of a reception of a color image or a monochromatic image in the facsimile apparatus of the present embodiment, and the program to execute this process is stored in the ROM 121.

At first, at a step S131, the line controlling task 23 is supervising whether or not the CI signal is arriving from the line. Here, when the line controlling task 23 detects the CI signal, the line capturing is implemented at a step S132. At that time, if the automatic reception has been set, the communication driving command is issued to the communication task 25. This causes the process proceeds to a step S133, and the communication task 25 proceed with checking on usage status of the memory (DRAM 118). The apparatus of the present embodiment is configured to alter its capability to be notified to a sender side with the initial identification signal (DIS signal) of the ITU-T T.30 in accordance with the memory capacity. That is, if the memory is free for not less than 200 KB, the color image reception is executed at a step S134, but if the memory is not free for 200 KB, the process proceeds to a step S135 so as not to implement the color image reception. In particular, if the remaining memory not less than 200 KB is available, using the DIS signal, the declaration of the BFT is implemented with the DIS signal (at a step S134). This will cause a color image as well as a monochromatic image in a size being proliferated for family use to become receivable. On the other hand, with less than 200 KB but not less than 20 KB, reception of color image in a size being proliferated for family use is not feasible, and therefore, the declaration of the BFT is not implemented with the DIS signal, but treating it as possible to receive monochromatic image, the DIS signal is transmitted (at a step S135). Moreover, with the remaining memory of less than 20 KB, the process proceeds to a step S131 without implementing facsimile reception (without transmitting the DIS signal).

Thus, until the DCS signal is received at a step S136, a transmission of the DIS signal is implemented repeatedly, and the command from the sender side terminal (reception command signal DCS or transmission command signal DTC) is waited.

Incidentally, such information that indicates the reception capability of the receiver side including the ECM as well as the BFT, resolution, the coding method, and image size has been added to the DIS signal here to be transmitted from the receiver side to the sender side. In the apparatus of the present embodiment, the declaration of the BFT is defined as a declaration to implement reception of a color image file. Thus, in the apparatus of the present embodiment, as a determining reference to implement reception, the threshold of two-stage color and monochromatic free memory space is set. This serves to prevent the received image data volume from overflowing not less than the free memory-area since the data volume of color images covering one page is more than the data volume of monochromatic images in comparison. In addition, the reason thereof is that if only one threshold is provided for received images, an inconvenience might arises, that is, in spite that the memory area being available to receive a monochromatic image, reception of the image might be rejected, or in the other way around, in spite that the memory area enough to receive and memorize color image even if the memory area being available to receive a monochromatic images, receiving operation of a color image is executed.

When the DIS signal, a declaration on those capabilities, are transmitted to the sender side by return, the sender side received these DCS signal, and instructs the receiver side for reception (at a step S136). Here, in the case of normal transmission, the reception command on the ECM, the coding method, the manuscript size, and resolution, etc. is transmitted from the sender side to the receiver side.

At a step S137, based on the DCS signal, it is determined whether or not the sender side is going to transmit color image with the BFT protocol. Here, when the sender side is going to transmit color image with the BFT protocol, the simple BFT declaration bit is risen in the DCS signal for shifting to the BFT mode. Moreover, according to the recommendation specified by the ITU-T T.30, the instructive information such as the coding method, manuscript size, and resolution, etc. is indispensable in the DCS signal, and therefore also in the case where color image is transmitted in the BFT, the information such as coding method, manuscript size, and resolution, etc. specified by the ITU-T T.30 different from the coding method, manuscript size, and resolution actually to be transmitted will be included in the DCS signal. Here, the TCF (training) is good, and shifting to the BFT mode and to the color reception is successful, the process proceeds to a step S138 to transmit the CFR signal (the confirmation for receipt preparation) by return.

Next, in response to this response, the sender side will transmit a file header describing what the color image information to be transmitted now is like in the same phase as the phase to transmit the image information. That file header is in accordance with the ITU-T T.434 recommendation. At a step S139, the receiver side receives the header information and moreover determines whether or not to receive the PPS-MPS signal showing that the image body information to succeed thereafter is being transmitted (at a step S140).

When these PPS-MPS signal is received, the process proceeds to a step S141, and with reference to the file name extension in the file name in the header, it is determined whether the file name exactly follows the predetermined format, or whether the coding method is the DPCM method at a step S142, the manuscript size is with a width of 360 mm, a length of 540 mm accepting the photograph in L size being a size for color image, and the official postcards, etc. at a step S143, and whether resolution is 90 dpi both for a main scanning and sub-scanning, and moreover whether the file volume of transmission image is a receivable volume at a step S144, and the like.

Here, addition of the file volume at a step S144 to the conditions to determine a receiving capability will make it possible to determine whether the image data is receivable at the stage when the header information has been received, and will get rid of inconvenience such that reception can not be implemented after the telephone line has been captured for a long time. Especially, this is much effective in the case of color image transmission where a large volume of data is transmitted. And at that time, as indicated in the recommendation, it is checked on whether the file can be decoded also with reference to the application reference, etc.

Thus, in the case where the file to be transmitted in is determined to be unable to be decoded or in the case where the file to be transmitted in is determined not to be receivable, the process proceeds to a step S145, and the FDM signal is transmitted by return. The contents of this FDM signal are described in the T.434, but as the contents of the FDM (rejection), the reasoning information such as "insufficient memory capacity," or "in sufficient remaining memory," etc. may be transmitted out to the sender side (transmitting party). Without being limited to the foregoing, as the reasoning information, discord of resolution, and of the coding method, etc., and the like may be transmitted out to the sender side. This enables the sender side to know not only the no-good nature but also how to restore capability of transmission, and thus the sender side will be able to cope therewith appropriately. In addition, as a condition to expand this FDM, the expansion taking place with reference to the header information will give rise to no problems on protocol.

Thus the process goes forward to a step S146, and the disconnection signal (DCN) from the sender side is received, then the communication task 25 calls out the line controlling task 23 to implement the line disconnection process.

On the other hand, when the reception of header information has been successful and the color image reception has become ready, the process proceeds to a step S147, and the MCF signal is transmitted out to the sender side. This causes the sender side to shift to transmission process of the file body. Next, at the receiver side, for the object of receiving the color image file, the color image identification bit is risen in the managing information on the image record. And simultaneously, the page record is created, and is linked with the image record. Since this information has been described before in the context of the received image printing performance, and explanation is omitted here.

Thus, when the sender side transmits the file body ("body" in FIG. 15) next, the process proceeds to a step S148, and the receiver side receives this. In this file body, the main scanning pixel number, the sub-scanning pixel number, the main scanning direction pixel number, and the sub-scanning direction pixel number are set, and after this information, image data compressed by the DPCM follows. Here, the main scanning direction pixel number, and the sub-scanning direction pixel number are set on the page record which is previously obtained. Thus, these pieces of information are set on the page record so that reference involving other tasks such as the recording task 29, etc. will become possible. At the same time, these BFT header information, and the main scanning pixel number, the sub-scanning pixel number, the main scanning direction pixel number, and the sub-scanning direction pixel number are also stored in the image file as they are, and thus, even if these images were separated from the information from the protocol, they will be able to be developed independently as an image. For example, as concerns an advantage from this, this image file loaded into the personal computer gives rise to an advantage that personal computer can regenerate the images. And on the contrary, in the case of the receiving terminal allowing only performance to record the received image directly, these pieces of information are transferred to the page record and thereafter may be transferred to the image file in a form with the information attached to these pieces of image information having been removed. In this case, the separation work on the header information in the recording task 29 will not be required so as to make handling simple. That is, the mode gets more like that of the normal reception process in the monochromatic image communication.

Here, the image data body (body) is the DPCM-coded data, and the data is transmitted in the form formatted with the HDLC as in the normal ECM (and this makes it possible to detect occurrence of an error). The receiver side goes forward to reception of the Q signal in receipt of the RCP. And in receipt of the PPS-EOP showing that the communication of data is over, the process proceeds from the step S149 to the step S150, and if there is no error in the received data, the MCF signal showing that there is no error in the received data is transmitted by return. And, when the DCN signal transmitted from the sender side is received, the communication task 25 drives the line control task 23 to disconnect the line so that the communication comes to an end (now shown in the drawings).

Next the process proceeds to a step 151, and based on the received image information, the image size and resolution are determined. Moreover, the communication task 25 closes the page record, and closes the image record to finish the communication task 25. Thus, when the communication task 25 gets over, since there exist unrecorded image data, the coding/decoding task 27 is driven (the step S152). This coding/decoding task 27 proceeds with decoding process not in accordance with resolution, the coding method, and manuscript size designated by the reception command signal (DCS signal) to be transmitted from the sender side, but in accordance with resolution, the coding method, and manuscript size shown in the header information to be transmitted in the phase where the image data of BFT mode are transmitted. When the decoding processing of this step S152 is completed, the process proceeds to the step S153 so that the recording task 29 is activated. And, the image processing is implemented so that the image data is converted to those with 360 dpi in accordance with resolution, the coding method, and manuscript size indicated in the header information to be transmitted in the phase where the image data of the BFT mode are transmitted, and the image recording is implemented based on those processed image data.

In addition, when the sender side does not want transmission with the BFT protocol, the DCS signal causes the process to proceed to the step S154, and based on that DCS signal, the main scanning size and resolution, etc. on the image data to be received now are determined and the confirmation signal for receipt preparation (CFR) is transmitted to the sender side at a step S155. Next, the process proceeds to a step S156, and the image signal to be transmitted is received, and when the PPS-EOP signal is received, the process proceeds from the step S157 to the step S158, and the received image data is decoded and recorded by the recording unit 120.

Thus, when color image or image with size, resolution, and coding method not standardized according to the ITU-T recommendation are transmitted, by executing a standard communication procedure with high flexibility without using any non-standardized procedure, communication between facsimile apparatus respectively manufactured by different manufacturers is made possible, and transmission and reception of highly quality image can be executed in an appropriate data volume correspondent with the relevant image size, and such image communication can be realized that the image processing at the receiver side is much more simplified. In addition, thus even if image data not standardized by the ITU-T recommendation such as photographic L size as well as official postcard size are transmitted, the image data can be transmitted and received with an appropriate data volume swiftly and with highly good image quality, and the; image data can be transmitted and received as well as recorded so as to fit in with resolution of the recording unit (printer) at the receiver side.

The foregoing explanation has been made for the case of communication between facsimile apparatus having function of the present embodiment. But, since the BFT is actually a file transmission, and the counter side may be a personal computer, etc., and therefore, the BFT declaration gives rise to an intention that various files should be transmitted. To that effect, an explanation is to follow hereunder.

In the case where the sender side is now trying to transmit a completely different file (such as, the Excel which is a spreadsheet software, and the Word which is a sentence creation software, etc.), the name extension of a file which describes the file name of the header information is, for example, ".xls." Therefore, with reference to this name extension, it can be confirmed that a file is not applicable. This enables to make a notice that the file is not acceptable, by transmitting the FDM signal by return to the next Q signal. Due to this, according to the contents of the FDM signal, the sender side might want to transmit files of different form, and transmit the header again. Also in this case, the FDM signal will similarly be transmitted by return. In case of some sender side terminals, their operation might not be predicted, and therefore, the number of return of the FDM signal is counted so that the transmission might not go on forever. That is, when the FDM signal is transmitted not less than predetermined times, the line is disconnected so that the telephone line is prevented from continuing to be captured without any objects.

Here, by not disconnecting the line with the DCN signal being transmitted out immediately since any upper-version of apparatus having the communication functions of the apparatus of the present embodiment could be transmitting, and therefore it is set that one repetition of transmission of the header is waited for. And or, when it has been determined that the communication attribute is not correspondent, it is safe that the DCN signal is immediately transmitted to disconnect the line.

Next, when the name extension of the file is the same as that of the apparatus of the present embodiment by chance, authentication of the header is regarded as OK, and as a result, as shown in FIG. 15, the sender side could shift to transmission of the file body. In this case, the communication task 25 in the midst of reception refers to the configuration of the file body, and respective parameters of the main scanning and the sub-scanning, and if those values are abnormal ones, immediate treatment such as disconnection, etc. is taken. This serves to protect the sender side against incurring worthless transmission charges. But, in this case, upon the arrival of the image, the FDM signal may be returned.

In addition, as a check function, the coding/decoding task 27 is activated, and the data arriving from the line are immediately decoded, and checked on whether the length of one main scanning line is identical without any problems or whether the length of the sub-scanning direction length is identical without any problems, thus more strict check becomes possible.

Incidentally, in the aforementioned explanation, it is detected by the DIS signal of the ITU-T T.30 whether or not the receiver side comprises the BFT mode, but when further rapid communication is desired, after arrival of transmission, Ansam signal of known ITU-T V.8 procedure has been transmitted out, then the CM signal from the sender side may be detected, and next after the process has shifted to the V.34 procedure, it may be arranged for the sender side to be notified on that the receiver side has the BFT mode.

In addition, in the present embodiment, the procedure to receive the image data having attribute information of not specified by the ITU-T T.30 without using non-standard procedure but using the header information of the phase receiving the image information by the BFT procedure, but in the present embodiment, without being limited to the BFT, also in the case where the JPEG and the JBIG, etc. have been utilized, such method may be taken that the image data having attribute information of not specified by the ITU-T T.30 without using non-standard procedure but with the header unit of the phase receiving the image data succeeding the reception of the DCS signal is received. Incidentally, in this case, at the steps S134 and S135, there takes no transmission of the DIS signal the BFT of which have been put ON/OFF to notify the sender side of its BFT possibility, but the process is altered to the step to determine whether or not it has ability to receive the JPEG or the JBIG, and the step S137 sees the ON/OFF status of the BFT bit, and thus is altered to see the ON/OFF status of the JPEG bit and the JBIG bit, which alternation would be easily possible for those skilled in the art.

Figure 23:
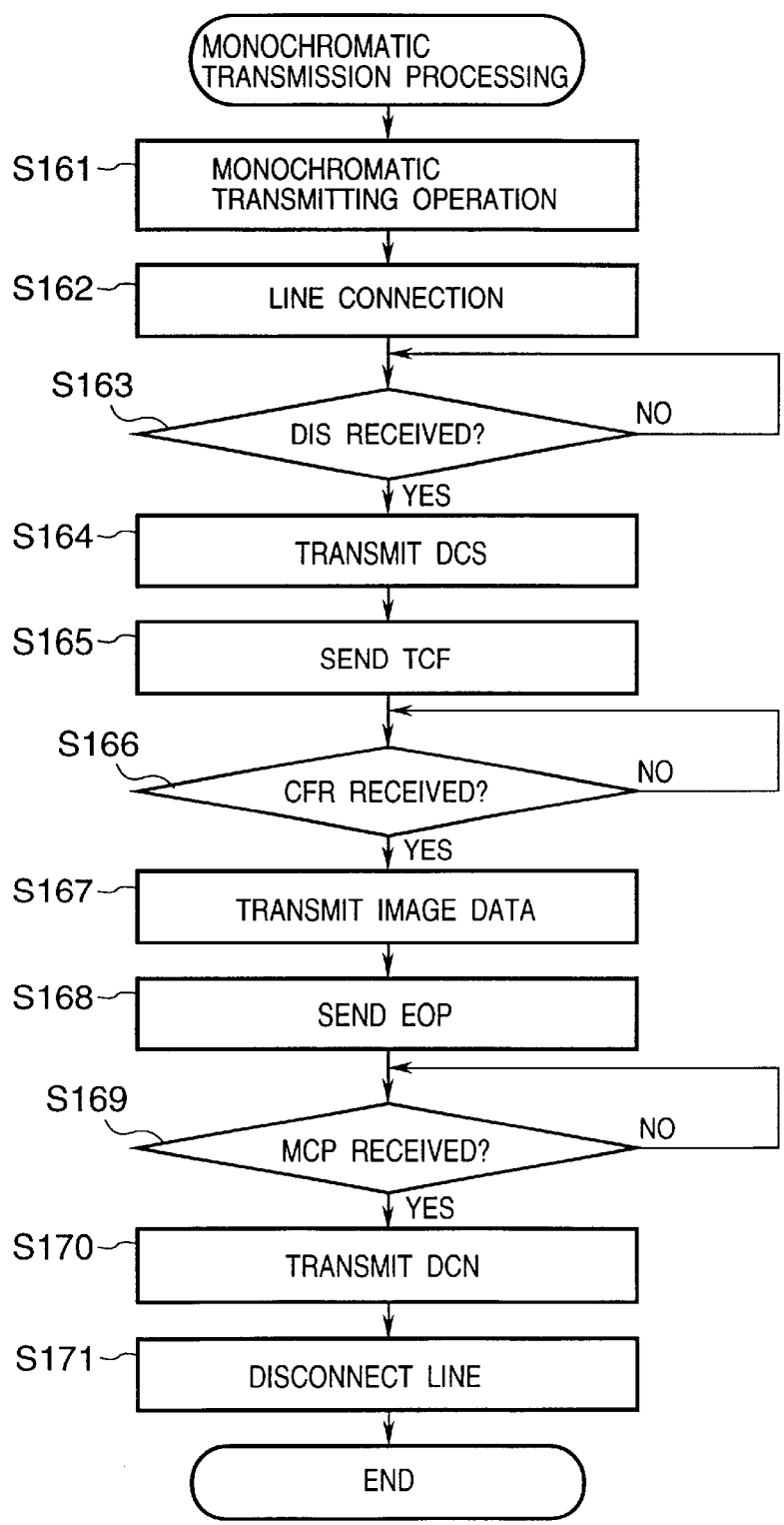
FIG. 23 is a flow chart showing a monochromatic transmitting process in the facsimile apparatus of the present embodiment.

Next, the transmission operation on a monochromatic image in an facsimile apparatus of the present embodiment will be explained with reference to the flow chart in FIG. 23. Incidentally, this monochromatic image transmitting operation has actually been executed by multitask as shown in FIG. 2, but here, for the object of simplification is shown such a flow chart as FIG. 23 and will be explained in accordance with that flow chart.

The monochromatic transmitting operation is instructed at the step S161, which is detected in the status supervising task 21 and drives the line controlling task 23. This causes the line control task 23 having been driven at the step S162 to connect the line to implement the calling operation to the instructed destination and the line control task 23 drives the communication task 25. Next, the process goes forward to the step S163, and the communication task 25 supervises whether or not the initial identification signal (DIS signal) specified by the ITU-T T.30 is received from the receiver side (the receiving party). Upon receipt of the DIS signal, the process proceeds to the step S164, and the transmission task 25 transmits the reception command signal (the DCS signal) to the receiver side in accordance with the functions which the receiver side has.

Here, in the case where more rapid communication is desired, the Ansam signal of the known ITU-T V.8 procedure may be detected, and thereafter the CM signal is transmitted so that the process shifts to the V.34 procedure to know the capability of the receiver side. In this occasion, such bit representing resolution, the coding method, and manuscript size, etc. of the DCS signal that can be processed by the receiver side, and specified by the ITU-T T.30 is selected.

Thereafter, the process proceeds to a step S165, and the training signal (TCF signal) of modem is transmitted, and it is supervised whether or not the confirmation signal for a receipt preparation (CFR signal) should be received from the receiver side (the step S166). When the CFR signal is received, the process proceeds to the step S167, and the coding/decoding task 27 is activated so that the read image data is converted into those with resolution and the main scanning width which the receiver side can receive and are coded with the coding method which the receiver side can receive, and those coded image data is transmitted to the receiver side. And when the image data to be transmitted is no longer left, the EOP is transmitted at the step S168, and upon receipt of the MCF signal from the receiver side at the step S169, the process proceeds to the step S170 to transmit the DCN signal. And the line disconnecting task 23 is activated at the step S171 to disconnect the line.

Figure 24:
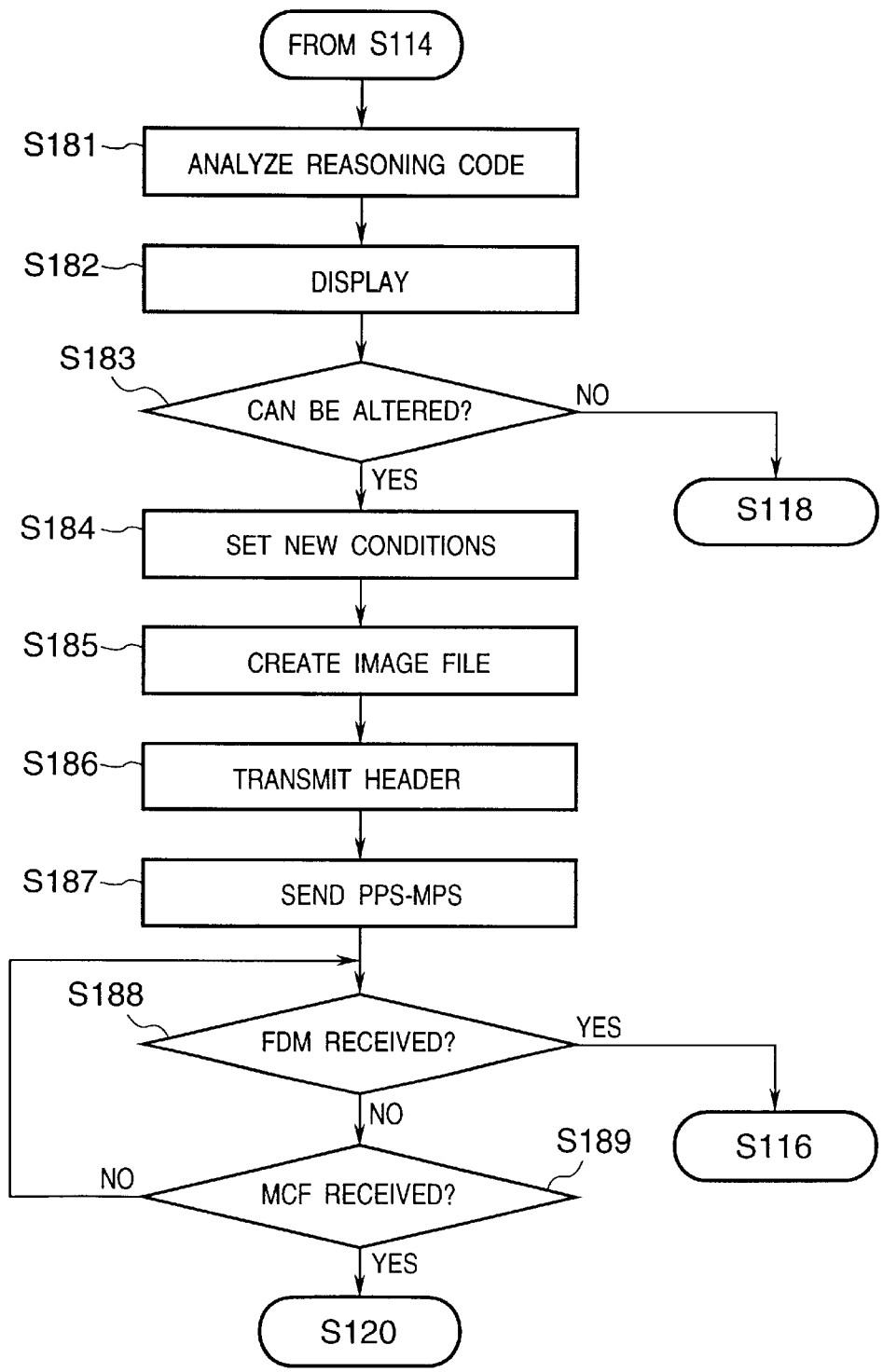
FIG. 24 is a flow chart showing a transmitting process in a case where a procedure in FIG. 17 is executed in the facsimile apparatus of the present embodiment.

In addition, FIG. 24 is for a flow chart showing a process of another embodiment in the case where the FDM signal is received from the receiver side with the BFT communication shown in FIG. 17.

This process commences with receiving the FDM signal at the step S114 in FIG. 21, and at first the reason of the rejection included in that FDM signal are analyzed at the step S181, and the reason is displayed in the display unit 36 to notify a user thereof. Next, the process proceeds to the step S183 to see if the reason can be changed with the apparatus of the present embodiment. For example, if only resolution is problematic, resolution is put under consideration for possible changes, and if the coding method is not correspondent, it is put under consideration whether any corresponding method (if the coding/decoding task 27 exists) can implement coding, etc., and if not possible, the process proceeds to a step S118 and the process goes on in accordance with the flow chart of aforementioned FIG. 21.

If possible, the process proceeds to the step S184, and those changed new condition is set, and being based on it, the image file to which a new header is attached is created (the step S185). Next, at the step S186, the file name as well as the name extension is treated as the header information of the BFT and transmitted as rapid data of the ECM, and in succession, at the step S187, the PPS-MPS signal is transmitted so as to transmit the file body.

When the FDM signal is received at a step S188, the process proceeds to a step S116 of FIG. 21 where the reason for that rejection is analyzed as described above and at a step S117, the reason why that error took place is displayed. In addition, when the MCF signal is received at a step S189, the process proceeds to a step 120 of FIG. 21, and the coding/decoding task 27 keeps on coding the image data body (readout data) 25 in the DPCM method to deliver the image data to the communication task 25 so that the communication task 25 transmits the data to the receiver side. The afterward operation is as aforementioned with reference to FIG. 21.

Incidentally, the present invention may be applied either to the systems which are configured with a plurality of apparatus (such as host computers, interface device units, readers, printers, etc.) or to a device comprising one device (such as a photocopier, and a facsimile, etc.).

In addition, the object of the present invention is also achieved by supplying the memory media, in which the program codes of the software to realize those functions of the aforementioned embodiment have been recorded, to the systems or the apparatus, and with the computer (or a CPU or an MPU) of those systems or apparatus reading out and executing the program code housed in the memory media.

In this case, the program codes themselves read from the memory media are to realize the function of the aforementioned embodiment, and those memory media having memorized those program codes are to configure the present invention.

As the memory media to supply the program codes, those such as floppy disks, hard disks, optical memory disks, magneto-optical disks, CD-ROMs, CD-Rs, magnetic tapes, nonvolatile memory cards, ROMs, etc. can be used.

In addition, by executing the program codes which the computer reads out, not only the functions of the aforementioned embodiment can be realized, but also based on the instructions of those program codes the OS (operating system), etc. in the midst of operation on the computer implement one part or all parts of the actual processing, which realizes the functions of the aforementioned embodiment inclusively.

Moreover, after the program codes readout from the memory media have been written in the memory which function extension boards inserted in the computers, or function extension units connected to the computers comprise, based on the instructions of those program codes the CPU, etc., which those function extension boards, or function extension units comprise, implement one part or all parts of the actual processing, which realizes the functions of the aforementioned embodiment inclusively.

As explained so far, according to the present embodiment, communication between different manufactures' models can be implemented by executing standard transmitting-receiving procedure with high flexibility without using any non-standardized procedure when color image, or image having image size, resolution, or coding method not standardized according to the ITU-T recommendation is transmitted and received.

In addition, it became feasible for immediate transmission and reception of highly quality image to be implemented in an appropriate data volume correspondent with the image size to be transmitted/received, and such image communication has become realizable that the image processing at the receiver side is much more simplified.

Moreover, the procedure for transmission and reception has been made changeable whether or not the attribute of the image data to be transmitted/received is standardized in the ITU-T recommendation so that the transmission and reception may become possible regardless of whether or not the attribute of the image data to be transmitted/received is standardized in the ITU-T recommendation.

Moreover, according to the present embodiment, when non-standardized procedure when color image, or image having image size, resolution, or the coding method not standardized according to the ITU-T recommendation is transmitted, the non-standard size, resolution or coding method is transmitted to the receiver side with the phase transmitting image data, and under ITU-T recommended procedure signal, the ITU-T recommended image size, resolution, or coding method is notified to the receiver side as a dummy signal, thus without giving rise to any contradiction with the ITU-T recommendation, implementation of transmission using a standard procedure has become possible.

The present invention is not limited to the above embodiments and various changes and modifications can be made within the spirit and scope of the present invention. Therefore, to apprise the public of the scope of the present invention, the following claims are made.

What is claimed is:

1. An image communicating device, comprising:

communication means for receiving an image in the G3 facsimile procedure;

reception command receiving means for receiving a reception command including an attribute of an image to be transmitted from a sender, regardless of the image attribute to be transmitted;

determination means for determining whether or not an image having an actual attribute can be processed in a case where information including the actual attribute has been received in a phase to receive the image succeeding of the reception command; and processing means for processing the received image by means of the actual attribute, not by means of the attribute included in the reception command, based on the determination by said determination means, wherein the actual attribute includes information of at least any of resolution, coding method, image sizes, and image data volume of the image to be transmitted.

2. The image communication device according to claim 1, wherein the actual attribute designates an image size corresponding to either a photograph L size or an official postcard size.

3. The image communication device according to claim 1, wherein the determination by said determination means is based on information on a file name extension.

4. The image communication device according to claim 1, further comprising transmission means for transmitting information to a sender in order to notify, when said determination means determines that the actual attribute cannot be processed.

5. An image communicating method, comprising:

a reception command receiving step, of receiving a reception command including an attribute of an image to be transmitted from a sender side, regardless of the image attribute to be transmitted;

a determination step, of determining whether or not an image having an actual attribute can be processed upon receipt of information including the actual attribute in a phase to receive the image succeeding reception of the reception command; and a processing step, of processing the received image by means of the actual attribute, but not the attribute included in a first reception command, based on the determination outcome in said determination step, wherein the actual attribute includes information of at least any of resolution, coding method, image sizes, and image data volume of the image to be transmitted.

6. The image communication method according to claim 5, wherein the actual attribute designates the image size corresponding to either a photograph L size or an official postcard size.

7. The image communication method according to claim 5, wherein in said determination step, decision-making is implemented based on information on a file name extension.

8. The image communication method according to claim 5, further comprising a transmission step, of transmitting information to a sender in order to notify, when it is determined that the actual attribute cannot be processed in said determination step.

9. A communication controlling method, comprising:

a readout step, of reading an original and generating image data;

a first communication step, of transmitting the image data using G3 facsimile procedures when a monochromatic image is transmitted;

a second communication step, of transmitting the image data using the second communication procedure of a binary file transfer communication procedure;

a format conversion step, of converting the image data format so that the image data can be transmitted by the second communication procedure;

a determination step, of determining, in a case of transmitting a color image, whether or not a receiver side performs the binary file transfer communication procedure, after negotiation with the receiver side by means of the G3 facsimile procedure; and a controlling step, of controlling transmission of the image data so as to transmit the image data format, converted in said format conversion step, based on the determination in said determination step.

* * * * *

UNITED STATES PATENT AND TRADEMARK OFFICE
CERTIFICATE OF CORRECTION

PATENT NO. : 6,775,033 B1
DATED : August 10, 2004
INVENTOR(S) : Hiroshi Nobuta et al.

It is certified that error appears in the above-identified patent and that said Letters Patent is hereby corrected as shown below:

Column 1,
Lines 42 and 46, "These" should read -- this --.

Column 4,
Line 9, "handy" should read -- hand --;
Lines 12 and 16, "flowchart" should read -- flow chart --; and
Line 20, "flow-chart" should read -- flow chart --.

Column 5,
Line 9, "an" should read -- a --;
Line 12, "comprise" should read -- comprises --;
Line 14, "which" should read -- whose -- and "enables" should read -- enables one --;
Line 28, "may" should read -- may be --; and
Line 30, "onochromatic" should read -- monochromatic --.

Column 6,
Line 30, "rotation" should read -- rotations --.

Column 7,
Line 2, "a-cartridge" should read -- a cartridge --;
Line 15, "used-for" should read -- used for --;
Line 18, "being" should be deleted; and
Line 63, "printing, of" should read -- printing of -- and "31:7" should read -- 317 --.

Column 10,
Line 43, "history/" should read -- history --;
Line 59, "the point of" should read -- that point in --; and
Line 61, "have" should read -- has --.

Column 12,
Line 27, "dial-start" should read -- dial start --; and
Line 40, "operation" should read -- operations --.

Column 13,
Line 15, "operation" should read -- operations --; and
Line 55, "Depression" should read -- Depression of --.

UNITED STATES PATENT AND TRADEMARK OFFICE
CERTIFICATE OF CORRECTION

PATENT NO. : 6,775,033 B1
DATED : August 10, 2004
INVENTOR(S) : Hiroshi Nobuta et al.

It is certified that error appears in the above-identified patent and that said Letters Patent is hereby corrected as shown below:

Column 14,
Line 29, "he/see" should read -- he/she --;
Line 37, "hung" should read -- hang --;
Line 39, "Hung" should read -- Hang --; and
Line 51, "image-transmission" should read -- image transmission --.

Column 15,
Line 58, "is occurred" should read -- occurs --.

Column 16,
Line 3, "normally" should read -- normal --;
Line 17, "is" should read -- has --;
Line 47, "changing" should read -- changes --; and
Line 62, "a" should be deleted.

Column 17,
Line 2, "a" should read -- to --;
Line 11, "speaker, 18" should read -- speaker 18 --;
Line 40, "to proceed" should read -- proceeds --; and
Line 42, "having" should read -- has --.

Column 18,
Line 5, "is" should read -- has --;
Line 21, "exist" should read -- exists --;
Line 42, "occurred" should read -- occurring --;
Line 51, "no" should read -- not --; and
Line 57, "DRAM 118.," should read -- DRAM 118, --.

Column 19,
Line 17, "a" should read -- to --;
Line 20, "s" should be deleted;
Line 21, "exist" should read -- exists --;
Line 45, "personal-computer" should read -- personal computer --; and
Line 56, "receives" should read -- receiver --.

Column 20,
Line 52, "command, (DCN)" should read -- command (DCN) --.

UNITED STATES PATENT AND TRADEMARK OFFICE
CERTIFICATE OF CORRECTION

PATENT NO. : 6,775,033 B1
DATED : August 10, 2004
INVENTOR(S) : Hiroshi Nobuta et al.

It is certified that error appears in the above-identified patent and that said Letters Patent is hereby corrected as shown below:

Column 21,
Line 9, "octet" (first occurrence) should read -- octet. --;
Line 32, "is" should be deleted; and
Line 53, "on" should read -- of --.

Column 22,
Line 3, "codes," should read -- code, --;
Line 11, "comprises" should read -- comprise --;
Line 16, "a" should read -- to --; and
Line 56, "size" should read -- sizes --.

Column 23,
Line 1, "exist" should read -- exists --;
Line 3, "rejection-reasons" should read -- rejection reasons --;
Line 42, "the" (first occurrence) should read -- to --;
Line 62, "proceeds" should read -- to proceed --; and
Line 63, "proceed" should read -- proceeds --.

Column 24,
Line 36, "memory-area" should read -- memory area --;
Line 41, "arises," should read -- arise, --;
Line 46, "images," should read -- image, --; and
Line 50, "received these" should read -- receives this --.

Column 25,
Line 16, "these" should read -- this --;
Line 34, "much" should read -- very --; and
Line 46, ""in sufficient" should read -- "insufficient --.

Column 26,
Line 6, "and" should read -- the --;
Line 19, "these" should read -- this --; and
Line 59, "exist" should read -- exists --.

Column 27,
Line 29, "highly" should read -- high --;
Line 38, "the;" should read -- the --;
Line 55, "enables" should read -- enables one --; and
Line 62, "return" should read -- returns --.

UNITED STATES PATENT AND TRADEMARK OFFICE
CERTIFICATE OF CORRECTION

PATENT NO. : 6,775,033 B1
DATED : August 10, 2004
INVENTOR(S) : Hiroshi Nobuta et al.

It is certified that error appears in the above-identified patent and that said Letters Patent is hereby corrected as shown below:

Column 28,
Line 38, "on" should be deleted; and
Lines 40 and 47, "of" should be deleted.

Column 29,
Line 35, "is" should read -- are --;
Line 46, "receiving" should read -- the reception of --;
Line 47, "reason" should read -- reasons --; and
Line 61, "those" should read -- the --.

Column 30,
Line 60, "highly" should read -- high --.

Column 31,
Line 35, "succeeding" should read -- succeeding reception --.

Column 32,
Line 4, "sender side," should read -- sender, --.

Signed and Sealed this

Twenty-second Day of November, 2005

JON W. DUDAS
*Director of the United States Patent and Trademark Office*